US008656385B2

(12) United States Patent
Saka

(10) Patent No.: US 8,656,385 B2
(45) Date of Patent: Feb. 18, 2014

(54) DATA PROCESSOR, DATA MONITORING METHOD THEREOF, AND RECORDING MEDIUM STORING DATA MONITORING PROGRAM THEREOF

(75) Inventor: Shinya Saka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 31 days.

(21) Appl. No.: 12/552,638

(22) Filed: Sep. 2, 2009

(65) Prior Publication Data

US 2009/0327490 A1 Dec. 31, 2009

Related U.S. Application Data

(63) Continuation of application No. PCT/JP2007/055509, filed on Mar. 19, 2007.

(51) Int. Cl.
*G06F 9/445* (2006.01)

(52) U.S. Cl.
USPC ............ 717/174; 717/168; 709/220; 709/222

(58) Field of Classification Search
USPC .......................... 709/220, 222; 717/168, 174
See application file for complete search history.

(56) References Cited

U.S. PATENT DOCUMENTS

| 6,466,950 | B1 | 10/2002 | Ono |
| 7,117,531 | B2 | 10/2006 | Fukasawa |
| 7,376,945 | B1 * | 5/2008 | Kakumani et al. ............ 717/171 |
| 7,546,595 | B1 * | 6/2009 | Wickham et al. ............. 717/168 |
| 2004/0003387 | A1 * | 1/2004 | Ballard et al. ................ 717/170 |
| 2006/0185018 | A1 | 8/2006 | Saretto et al. |
| 2007/0079373 | A1 * | 4/2007 | Gassoway ....................... 726/22 |
| 2007/0288984 | A1 * | 12/2007 | Kim ............................... 725/131 |
| 2008/0028391 | A1 * | 1/2008 | Nallipogu et al. ............. 717/174 |

FOREIGN PATENT DOCUMENTS

| JP | 2002-023964 | 1/2002 |
| JP | 2002-358216 | 12/2002 |
| JP | 2004-094291 | 3/2004 |
| JP | 2005-258855 | 9/2005 |
| JP | 2005-332345 | 12/2005 |
| JP | 2006-079228 | 3/2006 |
| JP | 2006-228206 | 8/2006 |
| JP | 2007-052550 | 3/2007 |

OTHER PUBLICATIONS

Yuichi Sakaguchi, "Immediate Effect! Measures against Information Leakage Windows Can Do That Taking measures with Windows standard functions combined with dedicated software for preventing leakage" Nikkei Windows for IT professionals No. 96, Nikkei Business Publications Inc, Mar. 1, 2005, pp. 68-83.

(Continued)

*Primary Examiner* — Phuoc Nguyen
(74) *Attorney, Agent, or Firm* — Staas & Halsey LLP

(57) ABSTRACT

A data processor in which data processing is managed by an administrator and in which data processing including installation of software by a user is enabled. The data processor includes a processing unit to monitor the data processing executed by the user and to generate an execution history of the data processing, and a recording unit to record the execution history of the data processing.

17 Claims, 31 Drawing Sheets

(56) References Cited

OTHER PUBLICATIONS

Business Treasure Box NTT Comware realizes IT asset management and high security with low cost-terminal management software, 'AdminITy Ver4.0' goes on sale including a high policy check function, 'AdminITy Policy Option' Business communication, vol. 43, No. 1, Business Communication ltd, Jan. 1, 2006, pp. 144-145.

English Translation of the International Preliminary Report on Patentability issued Sep. 22, 2009 in corresponding International Patent Application PCT/JP2007/055509.
Japanese Office Action issued Jan. 8, 2013, in corresponding Japanese Patent Application No. 2009-504978.
Japanese Office Action dated Apr. 17, 2012 issued in corresponding Japanese Patent Application No. 2009-504978.
International Search Report for PCT/JP2007/055509, mailed May 22, 2007.

* cited by examiner

FIG.6

| REGISTERED SOFTWARE NAME | LAST UPDATED DATE | EXECUTION FILE NAME | FOLDER PASS | ISSUER (DIGITAL SIGNATURE) | MEASURE | MEASURE DATE |
|---|---|---|---|---|---|---|
| WORD PROCESSOR SOFTWARE | 2006/?/?? | aaa.exe | C:¥···· | A LTD. | USABLE | 2006/?/?? |
| SPREADSHEET SOFTWARE | 2006/?/?? | bbb.exe | C:¥···· | B LTD. | USABLE | 2006/?/?? |
| IMAGE EDITING SOFTWARE | 2006/??/?? | ccc.exe | UNKNOWN | UNKNOWN | USABLE | 2006/??/?? |
| FILE-EXCHANGING SOFTWARE | 2007/?/?? | AAA.EXE | C:¥···· | AA LTD. | UNINSTALL | 2007/?/?? |
| COMMUNICATION SOFTWARE | 2007/??/?? | BBB.EXE | D:¥···· | BB LTD. | DISPLAY WARNING | 2007/??/?? |
| UNKNOWN | 2007/??/?? | CCC.EXE | | UNKNOWN | SUSPEND | 2007/??/?? |

60  62  64  66  68  70  72

58

MANAGEMENT LIST DB  14

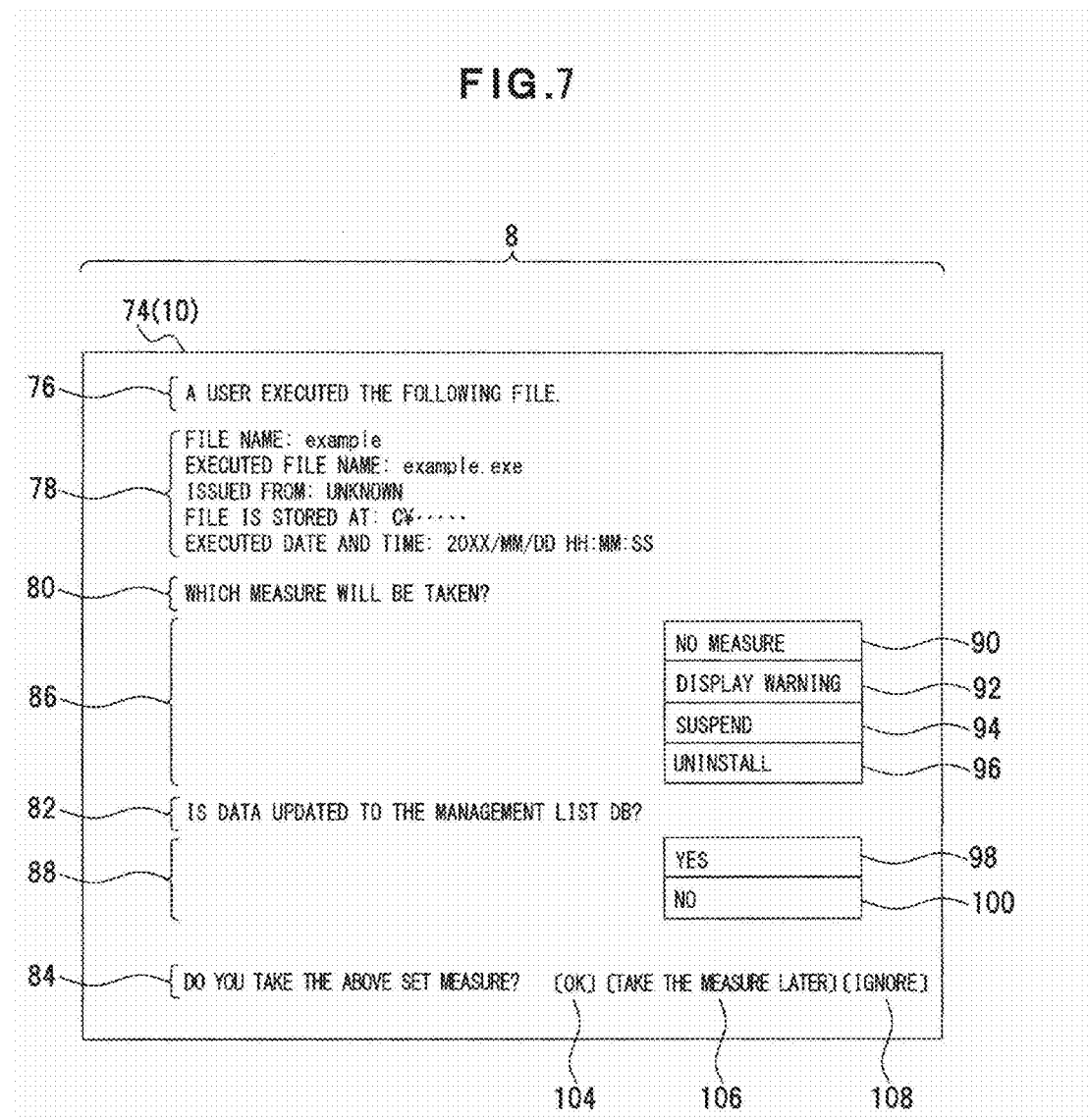

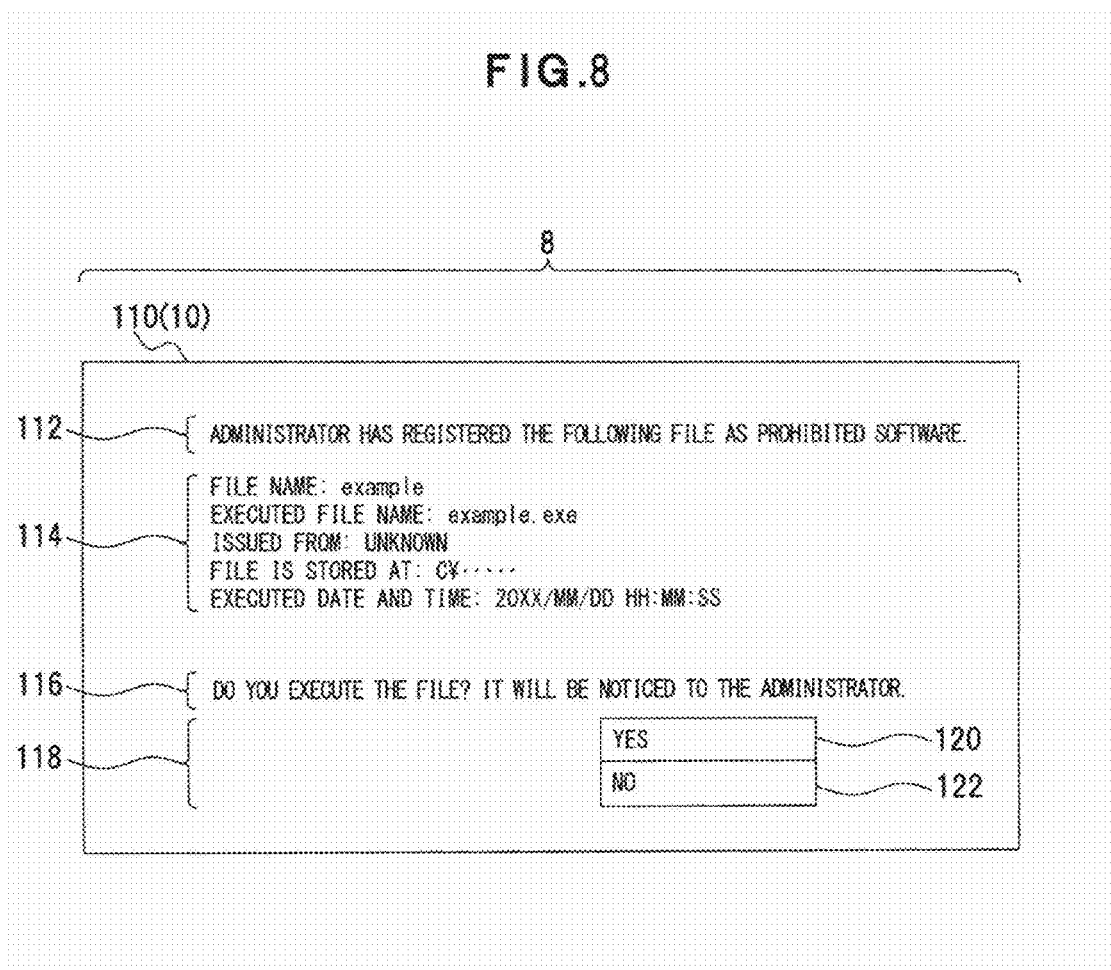

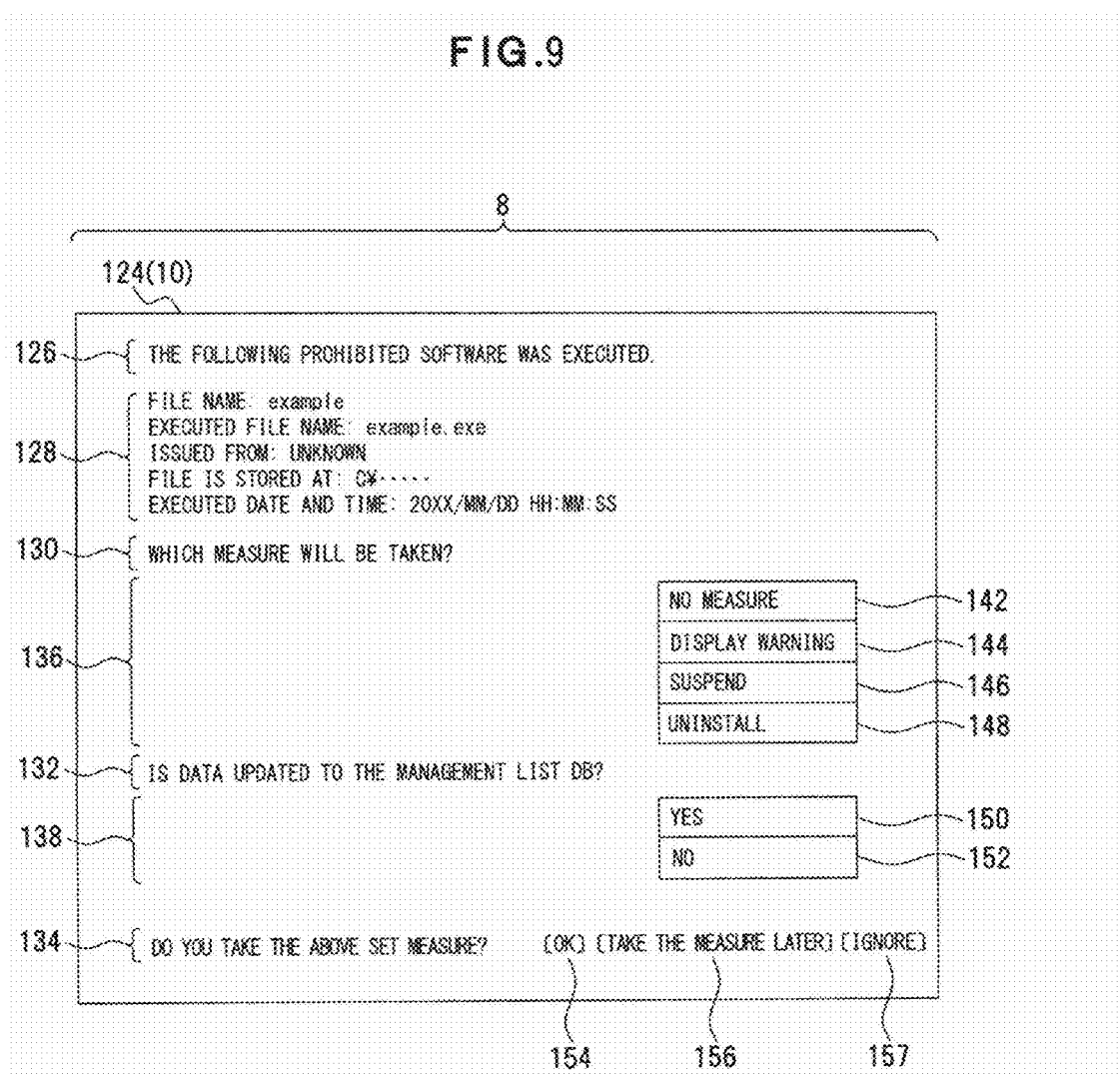

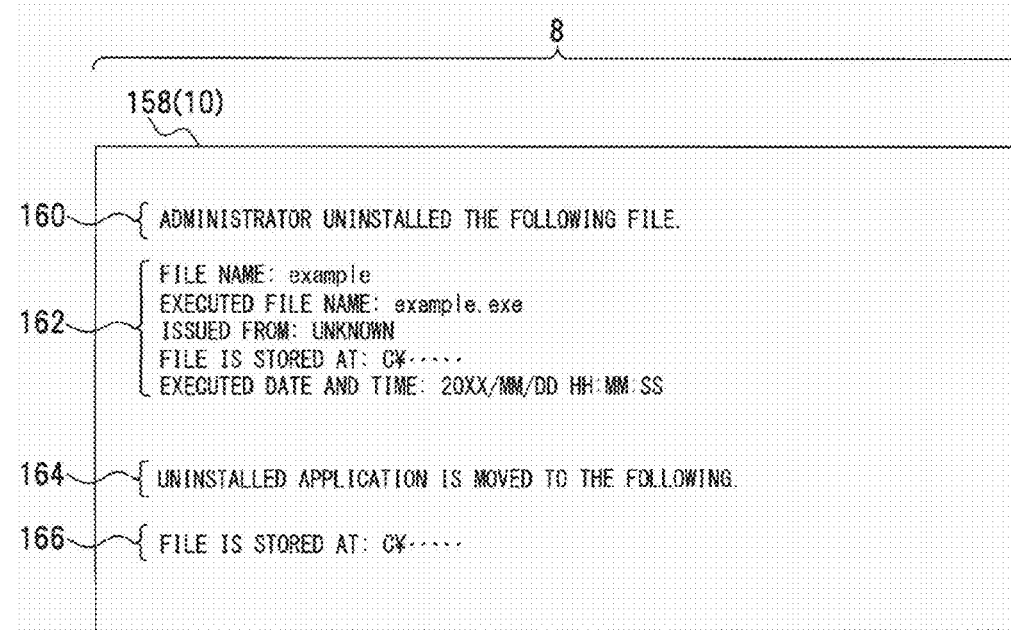

FIG.13

| REGISTERED SOFTWARE NAME | LAST UPDATED DATE | EXECUTION FILE NAME | FOLDER PASS | ISSUER (DIGITAL SIGNATURE) | MEASURE | MEASURE DATE |
|---|---|---|---|---|---|---|
| WARD PROCESSOR SOFTWARE | 2006/?/?? | aaa.exe | C:¥···· | A LTD. | USABLE | 2006/?/?? |
| SPREADSHEET SOFTWARE | 2006/?/?? | bbb.exe | C:¥···· | B LTD. | USABLE | 2006/?/?? |
| IMAGE EDITING SOFTWARE | 2006/??/?? | ccc.exe | D:¥···· | UNKNOWN | USABLE | 2006/??/?? |
| FILE-EXCHANGING SOFTWARE | 2007/?/?? | AAA.EXE | UNKNOWN | AA LTD. | UNINSTALL | 2007/?/?? |
| COMMUNICATION SOFTWARE | 2007/??/?? | BBB.EXE | C:¥···· | BB LTD. | DISPLAY WARNING | 2007/??/?? |
| UNKNOWN | 2007/??/?? | CCC.EXE | D:¥···· | UNKNOWN | SUSPEND | 2007/??/?? |

CLOSE

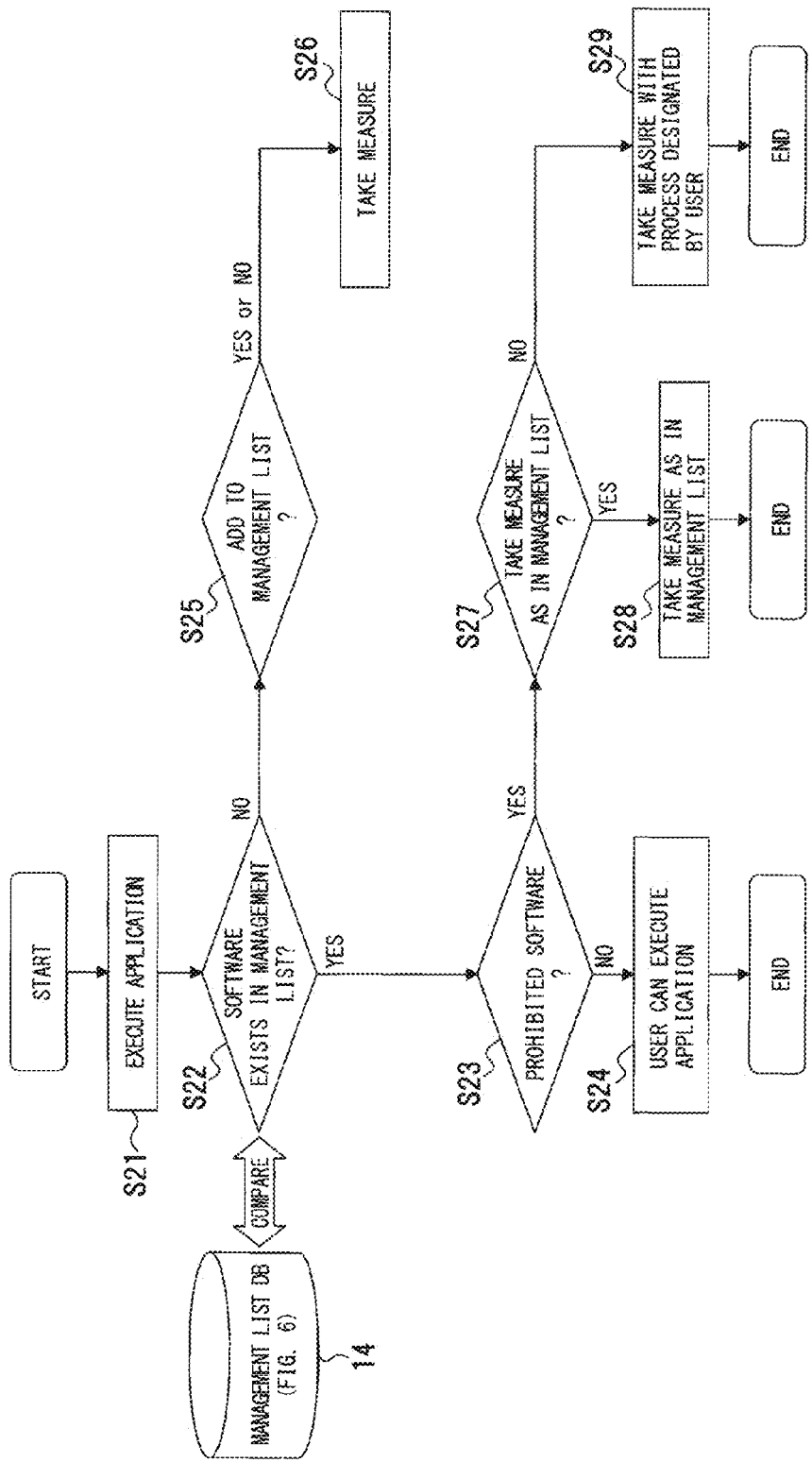

FIG.27

| | 58 | | | |
| 216 | 218 | 220 | 222 | 224 |
|---|---|---|---|---|
| USABLE SOFTWARE NAME | EXECUTION FILE NAME | UNUSABLE SOFTWARE NAME | EXECUTION FILE NAME | MEASURE |
| WARD PROCESSOR SOFTWARE | aaa.exe | FILE-EXCHANGING SOFTWARE | AAA.EXE | UNINSTALL |
| SPREADSHEET SOFTWARE | bbb.exe | COMMUNICATION SOFTWARE | BBB.EXE | DISPLAY WARNING |
| IMAGE EDITING SOFTWARE | ccc.exe | UNKNOWN | CCC.EXE | SUSPEND |
| ............... | ........ | .................. | ........ | ................ |

MANAGEMENT LIST DB

160 — ADMINISTRATOR UNINSTALLED THE FOLLOWING FILE AS PROHIBITED SOFTWARE.

162 — FILE NAME: AAAA
EXECUTED FILE NAME: aaaa.exe
ISSUED FROM: UNKNOWN
UNINSTALLED DATE AND TIME: 20XX/MM/DD HH:MM:SS

264 — ADMINISTRATOR MOVED UNINSTALLED SOFTWARE TO THE FOLLOWING FOLDER.

166 — FILE IS STORED AT: ·····

266 — IF USING, YOU NEED REINSTALLATION. IT WILL BE NOTIFIED TO THE ADMINISTRATOR.

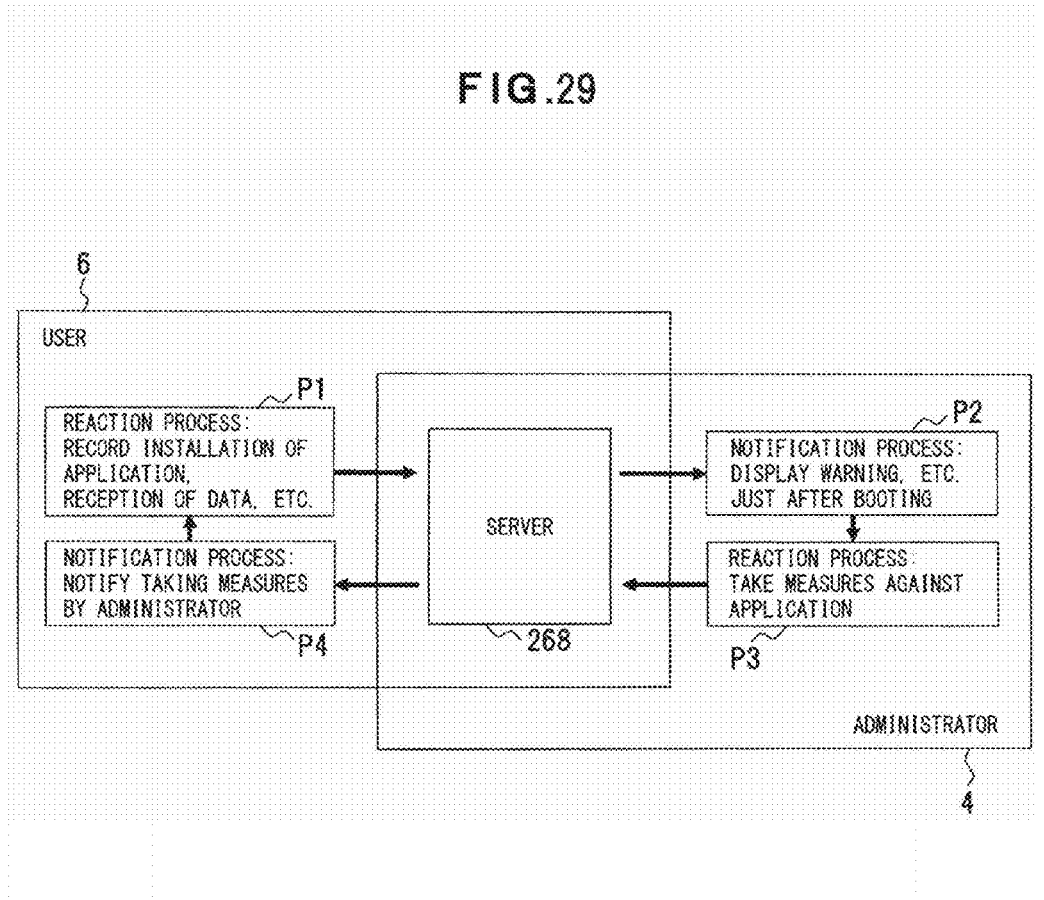

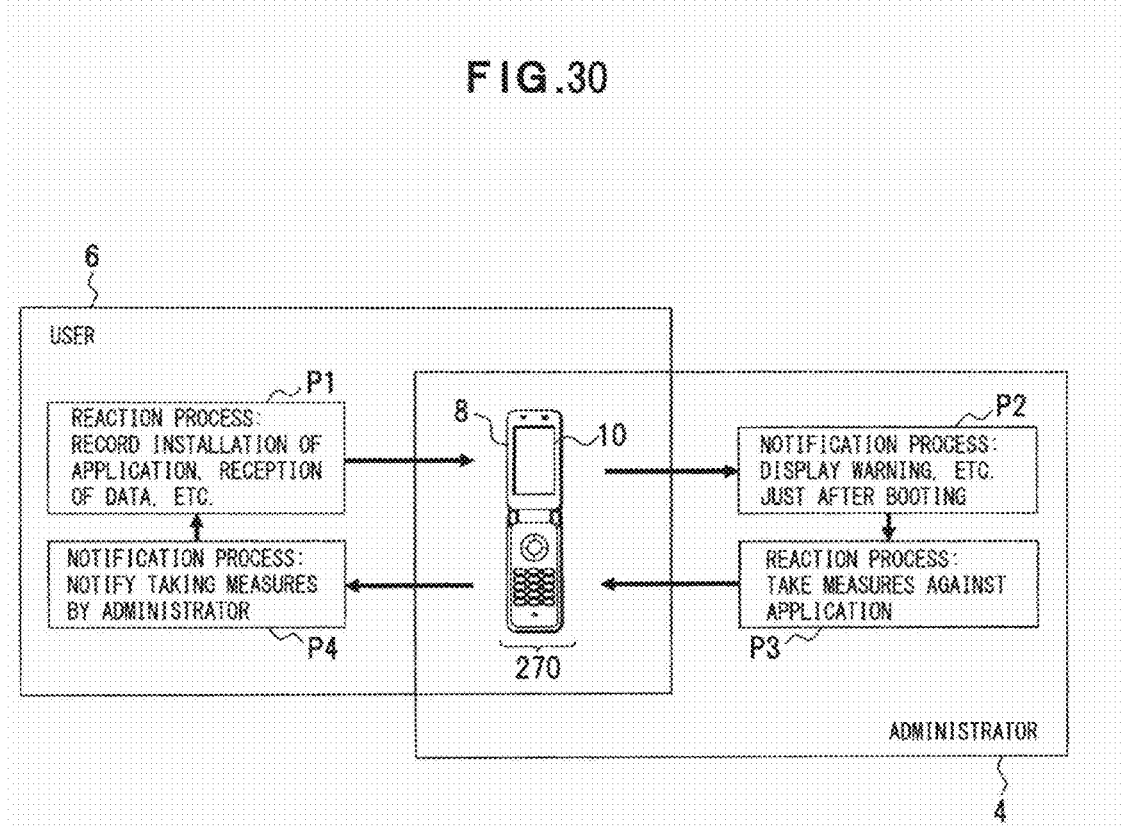

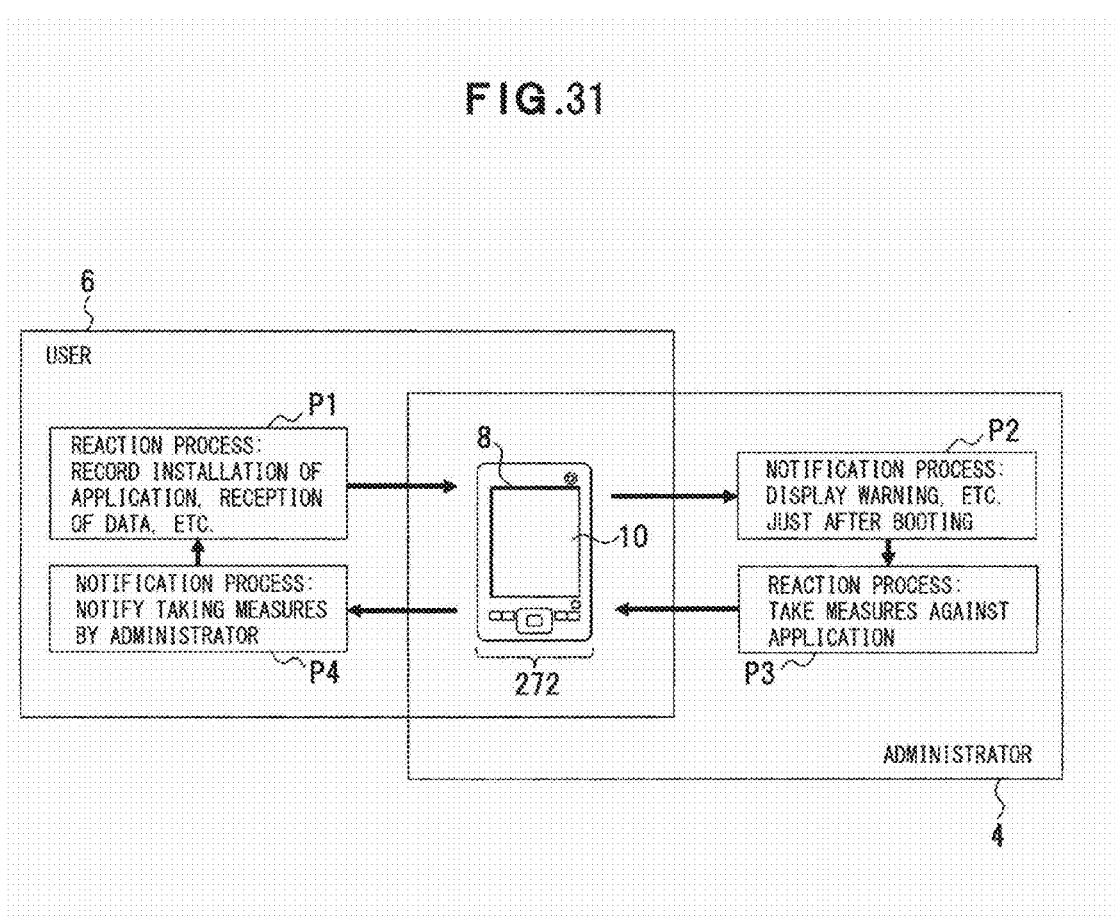

DATA PROCESSOR, DATA MONITORING METHOD THEREOF, AND RECORDING MEDIUM STORING DATA MONITORING PROGRAM THEREOF

CROSS-REFERENCE TO RELATED APPLICATION

This application is a continuation of International Application No. PCT/JP2007/55509, filed on Mar. 19, 2007, now pending, herein incorporated by reference.

FIELD

The embodiments discussed herein are related to data monitoring on various devices such as a personal computer (PC), a cellular phone, a server and a router, all of which execute data processing of execution of all kinds of software, obtaining and storing data and so on. The embodiments discussed herein are also related to a data processor which an administrator shares with a user, a data monitoring method thereof, a data monitoring program thereof, and a recording medium storing the data monitoring program thereof.

BACKGROUND

Data processing in a data processor such as a computer can be uniquely executed by a user. If a data processor is connected to the Internet, data can be transmitted and obtained via the Internet.

Concerning such data processing, Japanese Laid-open Patent Publication No. 2004-94291 discloses that: a management server and a client terminal are provided; the management server transmits a management program to the client terminal to execute the management program in the client terminal; thereby, information relating to a program in the client terminal is obtained; whether the program is inappropriate or not is determined; and if the program is inappropriate, warning information is given to the client terminal (Abstract, FIG. 1, etc.).

Japanese Laid-open Patent Publication No. 2005-258855 discloses that: a monitoring target terminal and a server are provided; when transmission/reception of information is executed in the monitoring target terminal via the Internet, history information showing a history of the transmission/reception is uploaded to the server; the server stores the history information, and makes a terminal for a manager download it in response to a request from the terminal for the manager; and the terminal for the manager displays the downloaded history information on a display screen (Abstract, FIG. 1, etc.).

Japanese Laid-open Patent Publication No. 2005-332345 discloses that: a plurality of client terminals, a manager terminal and a behavioral management server are provided; the client terminals monitor operation contents of a user, output log information thereof to the behavioral management server, restrict the user's use from restricted information obtained from the manager terminal; the behavioral management server detects a change in the operation contents of each client terminal from information extracted based on a previously set condition from the log information, and notifies the manager terminal of an analysis result thereof (Abstract, FIG. 1, etc.).

When a single PC is shared with a plurality of users, each user can execute processing according to a user's own situation. For example, the inconvenience is expected that data is leaked to the Internet against every user's will if one user downloads file-sharing software without other users' permission, and one of the other users executes data processing without knowing performing file-sharing. At home, it is expected that data of parents, who are administrators, is leaked to a network if some users install file-sharing software without the administrators' permission when a PC is shared with the parents, who are administrators, and children, who are the users.

It cannot be said that various types of data and software installed at an administrator side are not influenced by software and data installed at a user side. The data processor shared with an administrator and a user has inconvenience that credibility of data processing at an administrator side is damaged depending on processing at a user side.

Concerning such problems, there is no disclosure thereof in any of Japanese Laid-open Patent Publications Nos. 2004-94291, 2005-258855 and 2005-332345, and no disclosure about solving means thereof is presented.

SUMMARY

According to an aspect of the embodiments of the present invention, a data processor in which data processing is managed by an administrator and in which data processing including installation of software by a user is enabled includes a processing unit to monitor the data processing executed by the user and to generate an execution history of the data processing, and a recording unit to record the execution history of the data processing. Since the execution history concerning the data processing at the user side is generated and recorded in the recording unit according to such structure, the execution history can be known from the recording unit and the administrator can take action in accordance with the data processing of a user.

According to another aspect of the embodiments of the present invention, a data monitoring method of a data processor in which data processing is managed by an administrator and in which data processing including installation of software by a user is enabled included monitoring the data processing executed by the user and generating an execution history of the data processing, and recording the execution history of the data processing.

According to another aspect of the embodiments of the present invention, a computer-readable recording medium to store data monitoring program of a data processor, the data processor in which data processing is managed by an administrator and in which data processing including installation of software by a user is enabled includes monitoring the data processing executed by the user and generating an execution history of the data processing, and recording the execution history of the data processing.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

Other objects, features and advantages of the present invention are more clearly understood by referring to the attached drawings and each of the embodiments.

BRIEF DESCRIPTION OF DRAWINGS

FIG. 6 depicts one example of a management list;

FIG. 7 depicts one example of a dialog box screen in executing software which does not exist in the management list;

FIG. 8 depicts one example of a dialog box screen for a user in executing prohibited software;

FIG. 9 depicts one example of a dialog box screen for an administrator in executing prohibited software;

FIG. 10 depicts one example of a notification screen for the user;

FIG. 13 depicts one example of a display screen of a management list;

FIG. 14 is a flowchart depicting one example of processing procedure of data monitoring;

FIG. 20 is a flowchart depicting one example of processing procedure of determination of an application, a warning display and so on;

FIG. 27 depicts one example of a management list according to other embodiments;

FIG. 28 depicts one example of a notification screen according to the other embodiments;

FIG. 29 depicts a schema of a data monitoring function of a server according to the other embodiments;

FIG. 30 depicts a schema of a data monitoring function of a portable terminal device according to the other embodiments; and FIG. 31 depicts a schema of a data monitoring function of a PDA according to the other embodiments.

DESCRIPTION OF EMBODIMENTS

The embodiments of the present invention are related to a data processor such as a personal computer in which data processing is managed by an administrator and in which data processing including installation of software by a user is enabled. A user records data processing such as installation of software and obtainment of data as history information, and the history information is notified to an administrator. Thereby, the administrator can know a situation of the data processor. The history information is managed and stored in the data processor. The history information is notified to the administrator by the data processor. The notification of the history information to the administrator is by the data processor. The history information can be notified to the administrator from the data processor via another processor such as a portable terminal device by electronic mail, etc. The administrator can recognize the data processing at a user side explicitly. Thus, it can be avoided that the data processing at the user side influences data processing at an administrator side, and the data processing at the administrator side can be protected from data leaking such that the processing data is leaked to the Net. That is, credibility of data processing is enhanced, and management of processing at the user side is facilitated.

First Embodiment

Figure 1:
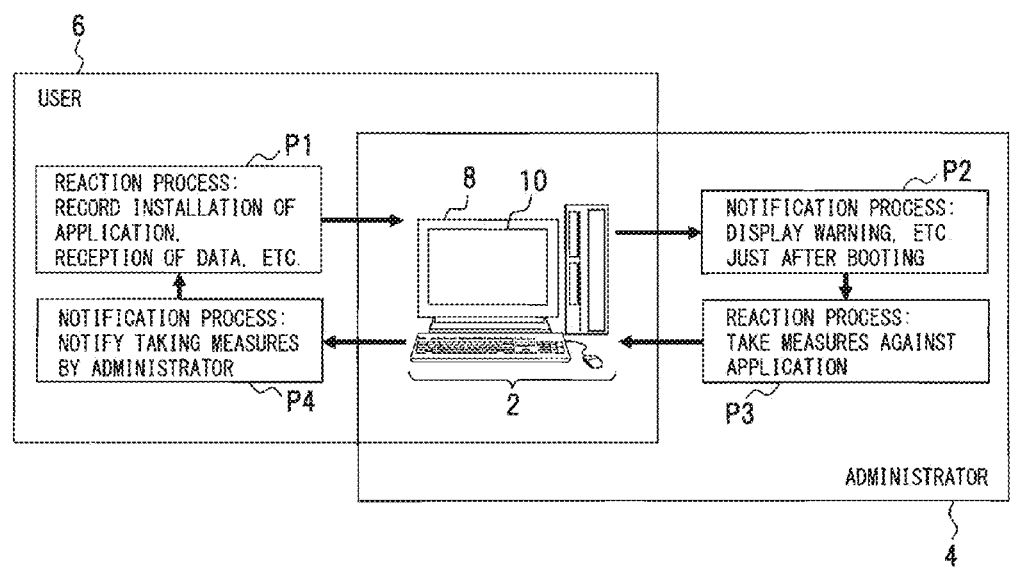
FIG. 1 depicts a schema of a data monitoring function of a data processor according to a first embodiment.

A first embodiment of the present invention is described with reference to FIG. 1. FIG. 1 depicts a schema of a data monitoring function of a data processor.

A data processor 2 is one example to which a data processor of the present invention, a data monitoring method thereof, a data monitoring program thereof, or a recording medium storing the data monitoring program thereof is applied. This data processor 2 is, as depicted in FIG. 1, managed by an administrator 4, and enables data processing by unique determination of a user 6. The data processor 2 has a data monitoring function such as recording of execution of data processing by the user 6, and notifying it to the administrator 4. This data monitoring function includes a reaction process P1, a notification process P2, a reaction process P3 and a notification process P4. Here, the administrator 4 is a management base managing all data processing about the data processor 2. The user 6 is a person who uses the data processor 2 and who can perform data processing with the person's own determination. Data processing performed by the user 6 is a process of installation of software such as an application, obtainment of data, storage thereof or the like. Execution notification is notification of execution of data processing performed by the user 6 and/or an execution record thereof. Notification means thereof may be any of display on a screen, electronic mail and so on.

The reaction process P1 is a process in accordance with an input by the user 6. The reaction process P1 is a process that in response to an input process by the user 6 such as installation of software, for example, file-sharing software, and reception of data, execution thereof is monitored, data representing an execution history expressing execution thereof is generated and recorded. The execution history includes data such as a user name, date and time of data executed or obtained by the user 6, the amount of data, a storage destination of data and a file format (extension) of data. Referring record of this execution history enables the administrator 4 to take reaction in accordance with data processing of the user 6.

Concerning this reaction process P1, used data of the administrator 4 and used data of the user 6 may be determined by using difference of the volume of a recording medium. However, if data when the administrator 4 used last was held in advance, change of the data can be known. When difference of the volume of a recording medium is determined, it is assumed that the volume of a recording medium is changed by setting of the user 6, etc. Thus, if an administrator 4 side registers setting of a volume error (by byte), limitation of the data acquiring volume per day by one user, setting prohibited data (determined by a file name or an extension), a harmful application list, etc. into a management list (management table) 58 (FIG. 6) and manages them, a case applicable can be detected. Such detection and a determination result may be displayed expressly by using warning, a pop-up display, etc. when the administrator 4 boots the data processor 2.

If the data processor 2 is booted by the administrator 4 after the reaction process P1 is ended, the notification process P2 is executed just after the booting. This notification process P2 is an execution notification such that data representing the execution history is generated which is the reaction process P1 by the input of the user 6. The execution notification is displayed on a display screen 10 of a display 8. This execution notification may include warning. The administrator 4 knows by the notification process P2 that the execution history of data processing of the user 6 is generated. The administrator 4 can prepare reaction and measures to protect data processing at the administrator 4 side in advance.

Based on the notification process P2, if the administrator 4 determines to be unnecessary by the displayed data, the measures to protect original data processing of the administrator 4 from damage from an application of a high malicious level is executed such as warning to the user 6, suspending the application thereof, forced deleting, etc. as the reaction process P3 of the administrator 4. This process may be constructed so as to be executed by the data processor 2 by itself. The administrator 4 can take necessary reaction in consideration of influence, etc. on its data processing and respect, etc. for the user 6 by the reaction process P3.

If the user 6 boots the data processor 2 after this reaction process P3 is executed, the notification process P4 is executed just after the booting. In this notification process P4, the reaction process P3 by the administrator 4 and processing contents thereof are displayed on the display screen 10. Confirmation of this display makes the user 6 result being taken measures at the administrator 4 side against the executed software, etc., and receiving warning against data processing of a high malicious level. This notification process P4 and the measures such as deleting against malicious data processing by the administrator 4 make the user 6 confirm will at the administrator 4 side to enable the user 6 to be urged to forbearing inconvenient data processing.

Concerning data processing such as installation of software and obtainment of data, after the user 6 obtains data from an outside via an application and a network, history information thereof is managed and stored by the data processor 2, and the history information is notified by a notification application, etc. on the data processor 2 and is notified from the data processor 2 to a portable communication terminal of the administrator 4 via electronic mail, etc. Thus, the administrator 4 side can grasp data processing contents at the user 6 side expressly.

As the above, along with the reaction process P1, the notification process P2 to the administrator 4 is executed. After the reaction process P3 by the administrator 4, the notification process P4 to the user 6 is executed. For these, even if the user 6 executes various kinds of data processing such as installation of an application such as file-sharing software and data obtainment with the user's own determination on the data processor 2 under the control of the administrator 4, the administrator 4 can know processing contents thereof and an execution history before data processing. Thus, data and data processing at the administrator 4 side can be protected from damage such as data leakage and data pollution.

Software which the administrator 4 uses and does not use (prohibited) is specified in advance, and data representing the software is managed and compared with installed software. Thereby, whether the installed software is prohibited is determined to enable the measures against the software quickly.

When the administrator 4 boots the data processor 2 without determining to be harmful or not concerning the user 6 installing software, it may be constructed that software not used or not to be used is installed is detected. It may be constructed that if such software is installed, warning is displayed as the notification process P2 in booting of the data processor 2 to execute the reaction process P3. Concerning a measure such as forced deleting, the measure may be taken by ranking. The administrator 4 can set ranking freely.

Concerning software which the administrator 4 does not register to the management list 58 (FIG. 6), if the user 6 executes the software, the administrator 4 can select how to take measures hereafter, and can register measures against the software in the management list 58.

When the user 6 executes installation of software which the administrator 4 sets prohibited, warning that the administrator 4 sets the software prohibited. However, installation can be performed.

A place (folder) for storing software may be set so that the software can be installed quickly assuming that the user 6 needs the software which the administrator 4 decides to be prohibited.

Figure 2:
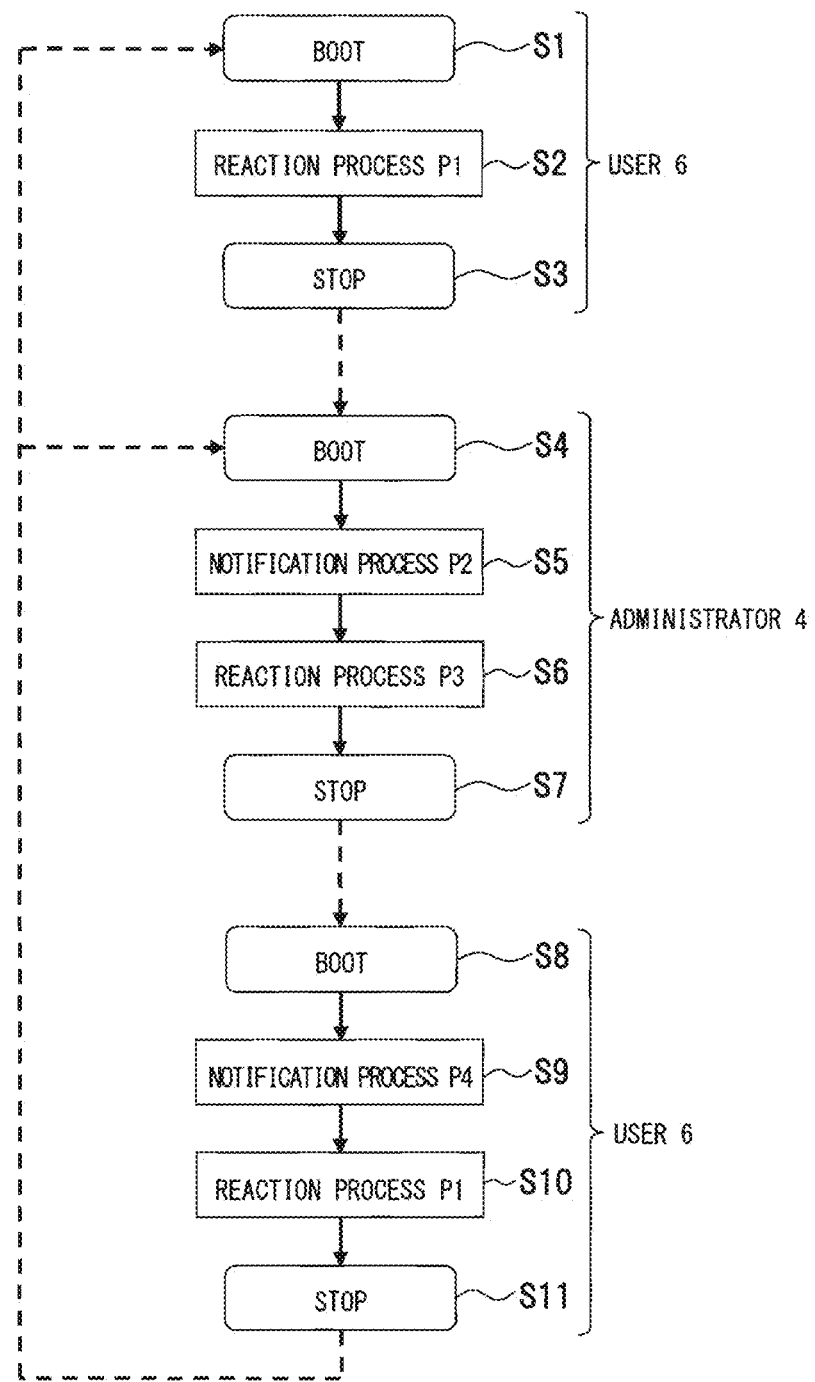
FIG. 2 is a flowchart depicting processing procedure of a data monitoring process.

Processing procedure of a data monitoring process is described with reference to FIG. 2. FIG. 2 is a flowchart depicting processing procedure of a data monitoring process. In FIG. 2, the same components as FIG. 1 are denoted by the same reference numerals.

This data monitoring process is processing procedure depicting a data monitoring function in chronological order. As described in the above, in the data monitoring function, the reaction process P1 and the notification process P4 for an input are executed when the user 6 boots the data processor 2, and the notification process P2 and the reaction process P3 are executed when the administrator 4 boots the data processor 2.

The user 6 boots the data processor 2 (step S1), and the reaction process P1 is executed for an input process executing data processing such as installation of software and obtainment of data (step S2). This reaction process P1 is, as described above, a process monitoring execution of an input process at the user 6 side, generating and recording an execution history, etc. The reaction process P1 includes a permission process such as forced execution of prohibited software by communication with the user 6.

After the user 6 stops the data processor 2 (step S3) and the administrator 4 boots the data processor 2 (step S4) the notification process P2 is executed (step S5) and by the administrator 4, the reaction process P3 is executed (step S6). The notification process P2 and the reaction process P3 are as described above.

After the administrator 4 stops the data processor 2 (step S7) and the user 6 boots the data processor 2, (step S8), the notification process P4 is executed (step S9), and for a data input, etc. by the user 6, the reaction process P1 is executed (step S10). The notification process P4 and the reaction process P1 are as described above.

When the user 6 stops the data processor 2 (step S11) and the user 6 boots the data processor 2, a process is as step S1 and the following step S1. When the administrator 4 boots the data processor 2, a process is as step S4 and the following step S4.

Figure 3:
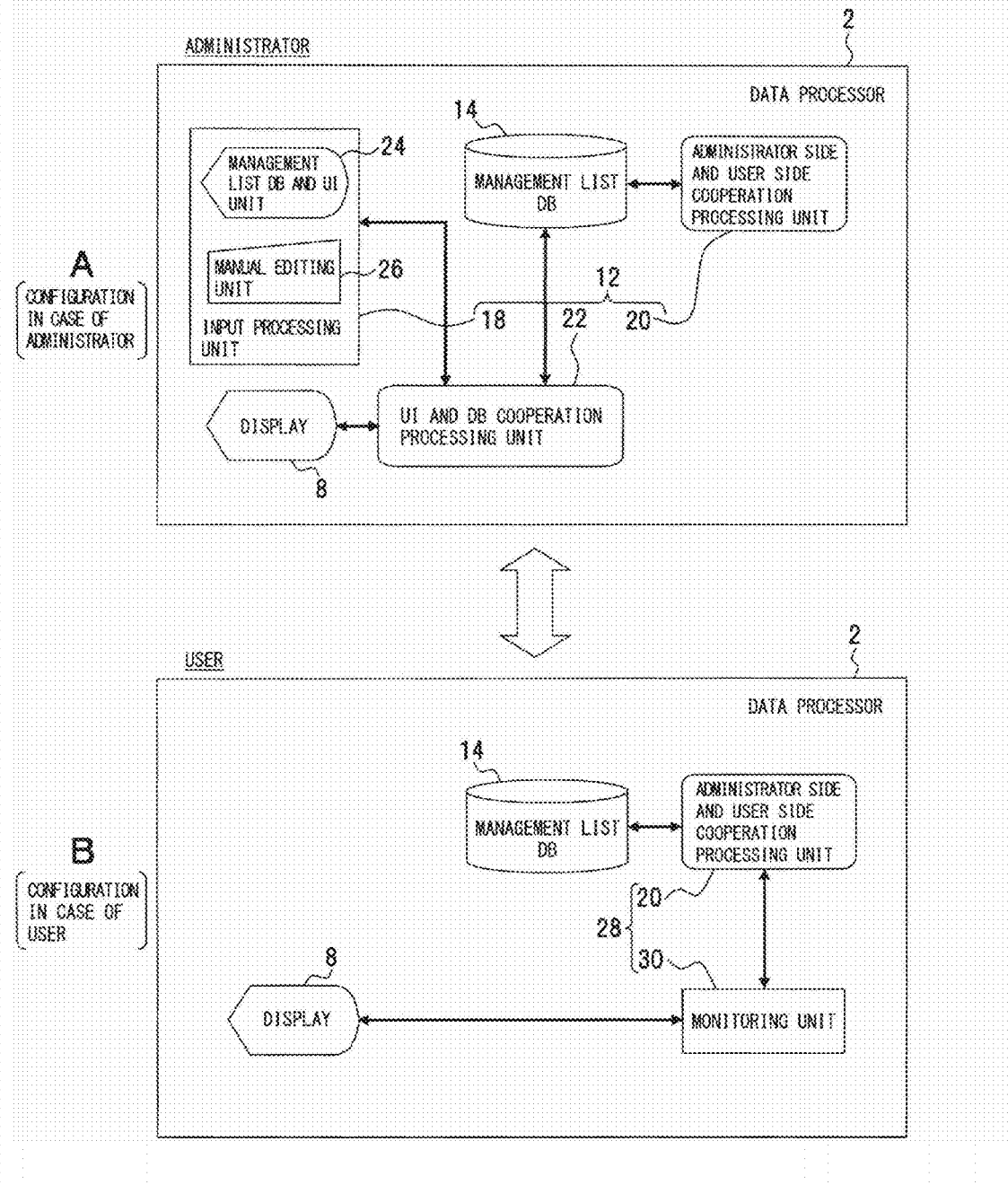
FIGS. 3A and 3B depict a configuration example of a data processor.
Figure 4:
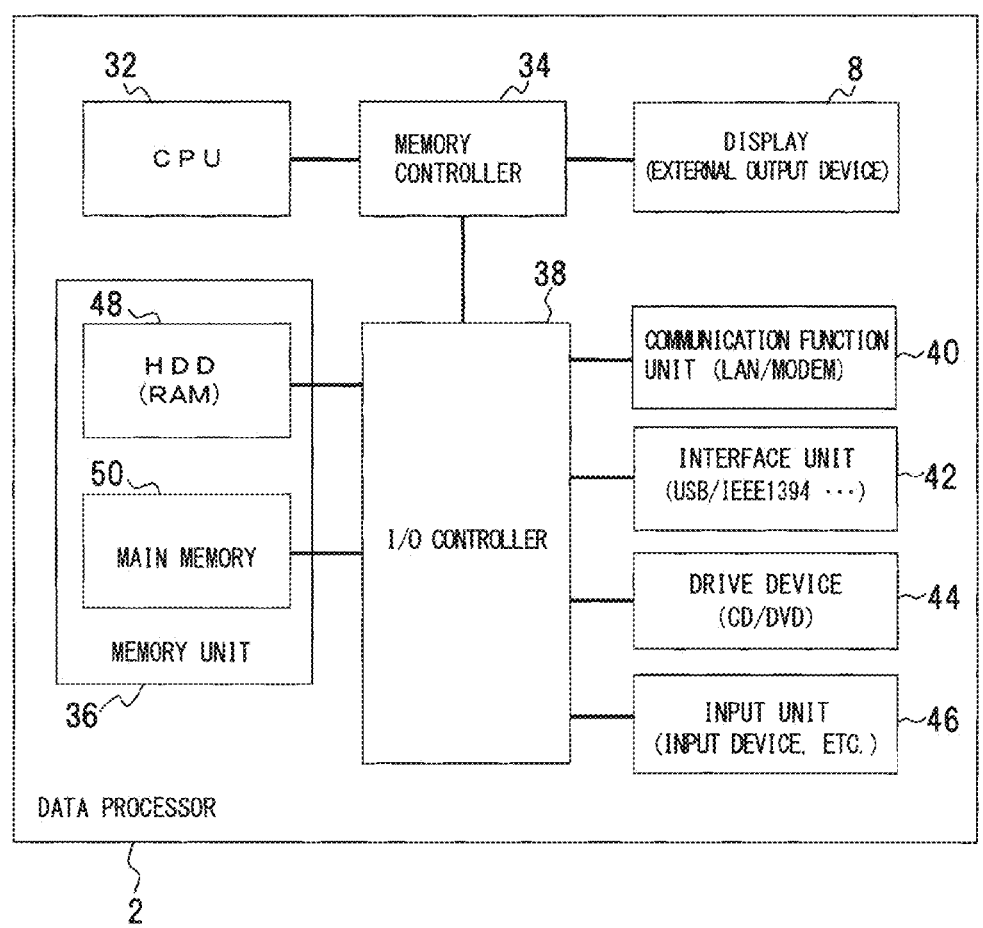
FIG. 4 depicts one example of hardware of the data processor.
Figure 5:
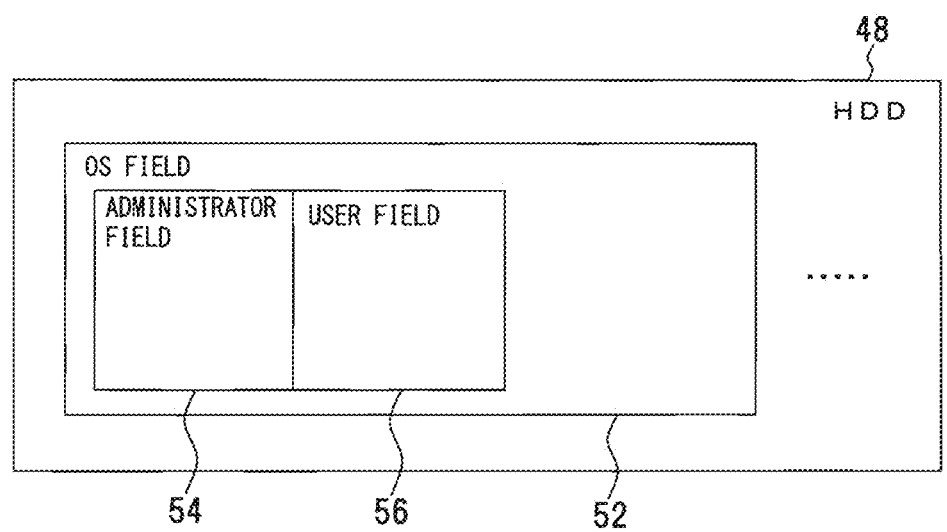
FIG. 5 depicts one example of a hard disc device.

The data processor 2 is described with FIGS. 3A, 3B, 4 and 5. FIGS. 3A and 3B depict a configuration example of the data processor, FIG. 4 depicts one example of hardware of the data processor and FIG. 5 depicts one example of a hard disc device. In FIGS. 3A, 3B, 4 and 5, the same components as FIG. 1 are denoted by the same reference numerals.

The data processor 2 is shared with the administrator 4 and the user 6. Since the administrator 4 and the user 6 have different authority, the data processor 2 is configured correspondingly to both of the authority. Then, it is necessary to determine whether an operator of the data processor 2 is the administrator 4 or the user 6. For determination thereof, for example, an inquiry screen inquiring an operator is generated by booting the data processor 2. From the inquiry screen, identification information (for example, ID, a password and a name) of the administrator 4 is inputted if the operator is the administrator 4, and identification information of the user 6 is inputted if the operator is the user 6. Thus, configuration in response to authority can be booted.

If the administrator 4 is an operator, the data processor 2 is configured so as to include a processing part 12, a management list database (DB) 14 and the display 8 as described in FIG. 3A.

The processing unit 12 is a means (unit) executing the above described notification process P2 (FIG. 1) and the reaction process P3 (FIG. 1), and is composed of an input processing unit 18, an administrator side and user side cooperation processing unit 20 and a user interface (UI) and DB cooperation processing unit 22.

The management list DB 14 is a means (unit) to which data in the management list 58 (FIG. 6) is registered. Into the management list 58, usable software, prohibited software, etc. are registered, and is referred to in the reaction process P1 for an input such as installation of software by the user 6.

The display 8 is a means (unit) presenting information by information display, generates a confirmation screen, a warning screen, etc. and is used for the notification process P2 and the reaction process P3.

The input processing unit 18 is a means (unit) inputting data for the management list DB 14 and inputting data of the reaction process P3 (FIG. 1), and is composed of a management list DB and UI unit 24 and a manual editing unit 26. The management list DB and UI unit 24 is a means (unit) generating the management list 58 of the management list DB 14, inputting various data for a list, etc. The manual editing unit 26 is a means (unit) editing data based on communication with a notification screen displayed on the display 8, etc. and a manual input of data.

The administrator side and user side cooperation processing unit 20 makes a process at the administrator 4 side cooperate with a process at the user 6 side, correlates software in the management list 58 of the management list DB 14 registered at the administrator 4 side with data processing at the user 6 side, and provides the management list 58 for the reaction process P1.

The UI and DB cooperation processing unit 22 is a means (unit) executing a cooperation process of the management list DB 14, the management list DB and UI unit 24 and the display 8. The UI and DB cooperation processing unit 22 reads out the management list 58 from the management list DB and UI unit 24, displays the read out management list 58 on the display unit 8, and executes input to the management list 58 by the management list DB and UI unit 24, or edition of the management list 58, display of a dialog box screen, a warning screen, etc. on the display 8, etc.

When the user 6 is an operator, the data processor 2 is configured so as to include the processing unit 28 and the display 8 as depicted in FIG. 3B.

The processing unit 28 is a means (unit) executing the reaction process P1 such as monitoring data processing of the user 6, and includes the administrator side and user side cooperation processing unit 20 and a monitoring unit 30.

In this case, the display 8 is, as described above, a means (unit) presenting information by information display, generates a confirmation screen, a warning screen, etc. at the user 6 side and is used for the reaction process P1 and the notification process P4, etc.

The administrator side and user side cooperation processing unit 20 functions similarly as at the administrator 4 side. The monitoring unit 30 executes the reaction process P1, etc. that monitors an input at the user 6 side, and monitors software installed by the user 6 and data taken in by the user 6.

As the above, at the administrator 4 side, the data processor 2 is configured to execute processes as depicted in FIG. 3A. At the user 6 side, the data processor 2 is configured to execute processes as depicted in FIG. 3B.

Hardware of this data processor 2 provides, as depicted in FIG. 4, function units such as a CPU (Central Processing Unit) 32, a memory controller 34, the display 8, a memory unit 36, an input/output (I/O) controller 38, a communication function unit 40, and interface unit 42, a drive device 44 and an input unit 46.

The display 8 is one example of an external output device such as a display, and a means (unit) presenting information by display.

The CPU 32 is a means (unit) executing various kinds of data processing such as taking in, editing, search, comparison and storage of data such as an application. The CPU 32 executes basic software (OS: Operating System) and an application program such as a data monitoring program in the memory unit 36, and controls function units such as the memory controller 34.

The memory controller 34 is a control means (unit) concerning data storage of the memory unit 36, etc. The memory controller 34 is controlled by the CPU 32, and executes memory control of reading out and writing in data in the memory unit 36 and control of an external output device such as the display 8.

The memory unit 36 is a means (unit) storing various data along with an OS and an application program. The memory unit 36 is constructed from a recording medium recording data readably by the CPU 32, and in this embodiment, is constructed of a hard disc device (HDD) 48 and a main memory 50. The HDD 48 composes a RAM (Random-Access Memory), stores an OS and a data monitoring program which is an application program, etc., and is a recording unit (data recording unit) recording contents of data processing and an execution history. The main memory 50 also composes a RAM, develops an OS and an application program, and is used as a work area for data processing.

The I/O controller 38 is a control means (unit) for input and output of data controlled by the CPU 32, and controls taking in data from an outside and outputting data to the outside.

The communication function unit 40 is a communication means (unit) executing transmission and reception of data by radio or by wired connection. The communication function unit 40 executes communication by a LAN (Local Area Network) that links the communication function unit 40 with other computers, a modem that executes modulation and demodulation of a data signal, and a telephone line with a portable terminal device such as a cellular phone.

The interface unit 42 is a connection means (unit) with an external device, is constructed from a USB (Universal Serial Bus) port, IEEE (Institute of Electrical And Electronics Engineers) 1394 port, etc., and is connected to an outside storage device, a computer, etc.

The drive device 44 is a means (unit) reading out and writing in data with a recording medium such as a CD (Compact Disc) and a DVD (Digital Versatile Disc).

The input unit 46 is an input means (unit) of data by an operator. An input device such as a keyboard device and a mouse device are connected to the input unit 46.

The HDD 48 is described with reference to FIG. 5. FIG. 5 depicts a storage field of the HDD.

In a storage field of the HDD 48, an OS field 52 for storing the above described OS is set, and, an administrator partition 54 as a data storage field at the administrator 4 side and a user partition 56 as a data storage field at the user 6 side are also set. In the administrator partition 54, various kinds of software such as an application and data are stored. In the user partition 56, various kinds of software such as an application and data are stored.

The management list DB 14 is described with reference to FIG. 6. FIG. 6 depicts one example of the management list.

The management list DB 14 is a data base for constructing the management list 58. The management list 58 is constructed from a table. In this management list 58, a registered software name 60, a last updated date and time 62, an execution file name 64, a folder pass 66, an issuer (digital signature) 68, a measure 70 and a measure date and time 72 are stored. In the registered software name 60, software names representing processing contents of word processor software and spreadsheet software, etc. as software taken into the data processor 2 are stored. In the last updated date and time 62, last updated date and time when software thereof was updated are stored. In the execution file name 64, execution file data is stored. In the folder pass 66, passes for set folders are stored. In the issuer (digital signature) 68, issuer names of stored software are stored. In the measure 70, measure contents against software such as usable, delete, display warning and suspend are stored. In the measure date and time 72, dates and times of measure thereof are stored.

Processing screens of the notification process P2 and the reaction process P3 are described with reference to FIG. 7. FIG. 7 depicts one example of a dialog box screen in executing software which does not exist in the management list.

This dialog box screen 74 is generated when the administrator 4 boots the data processor 2, and is generated on the display screen 10 when the user 6 executes software which does not exit in the management list 58. In this dialog box screen 74, a notification message 76 representing the execution, execution contents 78, inquiries 80, 82 and 84 and dialog boxes 86 and 88 are displayed.

On the notification message 76 representing execution, for example,

"A user executed the following file."

is displayed. Under the above, property information of software is expressed as the execution contents 78. For example, "File name: example
Executed file name: example.exe
Issued from: unknown
File is stored at: C¥•••••
Executed date and time: 20XX/MM/DD HH:MM:SS"

is displayed. In the inquiry 80, as a measure concerning this software, for example, "Which measure will be taken?"

is displayed. In the dialog box 86, boxes 90, 92, 94 and 96, each expressing "No measure", "Display warning", "Suspend" and "Uninstall" are set as concrete measures. If any one of these boxes 90-96 is checked, a measure therefor is determined.

In the inquiry 82, as a measure concerning data of this software, for example, "Is data updated to the management list DB?"

is displayed. In the dialog box 88, boxes 98 and 100, each expressing "YES" and "NO" are set as instruction manners thereof. If any one of these boxes 98 and 100 is checked, whether data thereof is updated is determined.

In the inquiry 84, about whether setting contents are determined, for example, "Do you take the above set measure?"

is displayed. Selection units 104, 106 and 108 are displayed. In the selection unit 104, "OK" for approving setting contents, in the selection unit 106, "Take the measure later" concerning the measure and in the selection unit 108, "Ignore" about an input are displayed. If one of them is selected and checked, one of processes is executed.

Processes in executing prohibited software in the reaction process P1 and the notification process P4 is described with reference to FIG. 8. FIG. 8 depicts one example of a dialog box screen for the user in executing prohibited software.

This dialog box screen 110 is generated on the display screen 10 when the user 6 executes software which is prohibited to be executed. On this dialog box screen 110, a warning message 112 thereof, execution contents 114, an inquiry 116 and a dialog box 118 are displayed.

On the warning message 112, for example,

"Administrator has registered the following file as prohibited software."

is displayed. Under the above, property information of software is expressed as the execution contents 114. For example, "File name: example
Executed file name: example.exe
Issued from: unknown
File is stored at: C¥•••••
Executed date and time: 20XX/MM/DD HH:MM:SS"

is displayed. In the inquiry 116, since the administrator designates the file as prohibited software, for example, "Do you execute the file? It will be noticed to the administrator."

is displayed as a measure of a user including a warning of notifying the administrator. In the dialog box 118, as instruction alternatives, boxes 120 and 122, each expressing "YES" and "NO" are set. If any one of these boxes 120 and 122, for example, "YES" is selected, execution can be performed on condition that the execution is notified to the administrator. In response to this execution, notification information to an administrator is generated. If "NO" is selected, notification to the administrator is not performed, and the execution is not performed, neither.

A processing screen of prohibited software in the notification process P2 and the reaction process P3 is described with reference to FIG. 9. FIG. 9 depicts one example of a dialog box screen for an administrator in executing prohibited software.

This dialog box screen 124 is generated when the administrator 4 boots the data processor 2, and is generated on the display screen 10 when the user 6 executes prohibited software in the management list 58. In this dialog box screen 124, a notification message 126 representing execution thereof, execution contents 138, inquiries 130, 132 and 134 and dialog boxes 136 and 138 are displayed.

On the notification message 126 representing the execution, for example,

"The following prohibited software was executed."

is displayed. Under the above, property information of software is expressed as the execution contents 128. For example, "File name: example
Executed file name: example.exe
Issued from: unknown File is stored at: C¥•••••
Executed date and time: 20XX/MM/DD HH:MM:SS"
is displayed. In the inquiry 130, as a measure concerning this software, for example,
"Which measure will be taken?"
is displayed. In the dialog box 136, boxes 142, 144, 146 and 148, each expressing "No measure", "Display warning", "Suspend" and "Uninstall" are set as concrete measures. If any one of these boxes 142-148 is checked, a measure therefore is determined.

In the inquiry 132, as a measure concerning data of this software, for example,
"Is data updated to the management list DB?"
is displayed. In the dialog box 138, boxes 150 and 152, each expressing "YES" and "NO" are set as instruction manners thereof. If any one of these boxes 150 and 152 is checked, whether data thereof is updated is determined.

In the inquiry 134, about whether setting contents are determined, for example,
"Do you take the above set measure?"
is displayed. Selection units 154, 156 and 157 are displayed. In the selection unit 154, "OK" for approving setting contents, in the selection unit 156, "Take the measure later" concerning the measure, and in the selection unit 157, "Ignore" about an input are displayed. If one of them is selected and checked, one of processes is executed.

The notification process P4 is described with reference to FIG. 10. FIG. 10 depicts one example of a notification screen for a user.

This notification screen 158 is generated on the display screen 10 as the notification process P4 when the user 6 boots the data processor 2. In this notification screen 158, a notification message 160 thereof, execution contents 162, a notification message 164 and another message 166 are displayed.

In the notification message 160, for example,
"Administrator uninstalled the following file."
is displayed. Under the above, property information of software is expressed as the execution contents 162. For example,
"File name: example
Executed file name: example.exe
Issued from: unknown
File is stored at: C¥•••••
Executed date and time: 20XX/MM/DD HH:MM:SS"
is displayed. In the notification message 164, as processing contents, for example,
"Uninstalled application is moved to the following."
is displayed. In another message 166, for example,
"File is stored at: C¥•••••"
is displayed.

Figure 11:
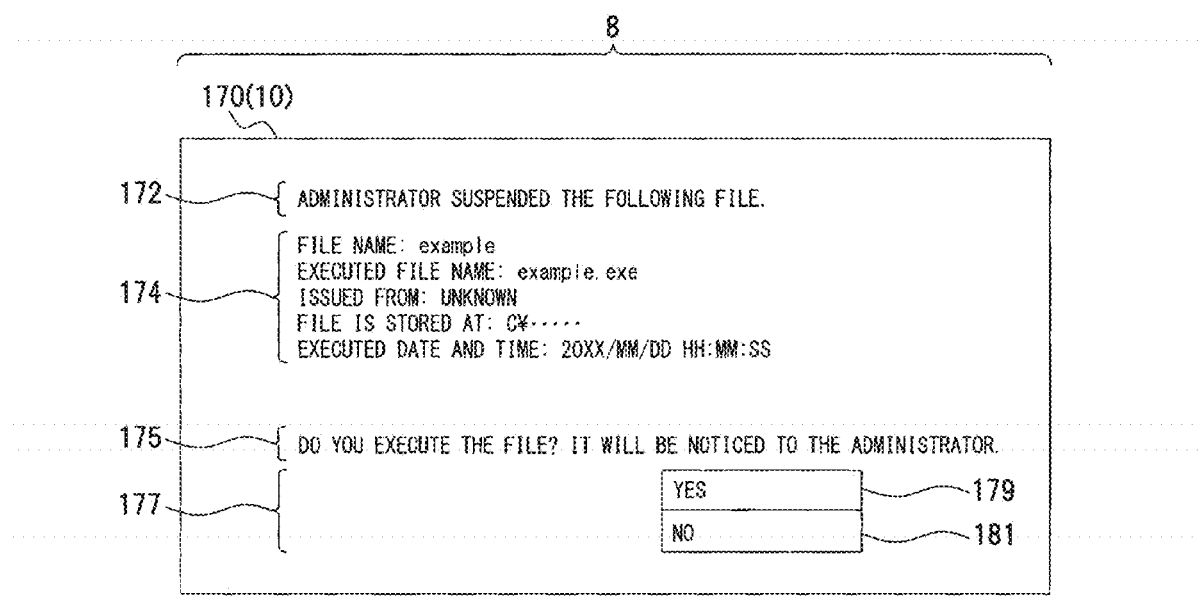
FIG. 11 depicts one example of a dialog box screen for the user.

The notification process P4 is described with reference to FIG. 11. FIG. 11 depicts one example of a dialog box screen for a user.

This dialog box screen 170 is generated on the display screen 10 as the notification process P4 when the user 6 boots the data processor 2, and when suspending of software is executed by an administrator. On this dialog box screen 170, an alarm message 172 thereof, execution contents 174, an inquiry 175 and a dialog box 177 are displayed.

In the alarm message 172, for example,
"Administrator suspended the following file."
is displayed. Under the above, property information of software is expressed as the execution contents 174. For example,
"File name: example
Executed file name: example.exe
Issued from: unknown
File is stored at: C¥•••••
Executed date and time: 20XX/MM/DD HH:MM:SS"
is displayed. In the inquiry 175, since the administrator suspends the software, for example,
"Do you execute the file? It will be noticed to the administrator."
is displayed as a measure of a user including warning of notifying the administrator. In the dialog box 177, boxes 179 and 181, each expressing "YES" and "NO" are set as instruction alternatives. If any one of these boxes 179 and 181, for example, "YES" is selected, execution can be performed on condition that the execution is notified to the administrator. In response to this execution, notification information to an administrator is generated. If "NO" is selected, notification to the administrator is not performed, and the execution is not performed, neither. In this dialog box screen 170, only the alarm message 172 and the execution contents 174 may be displayed.

Figure 12:
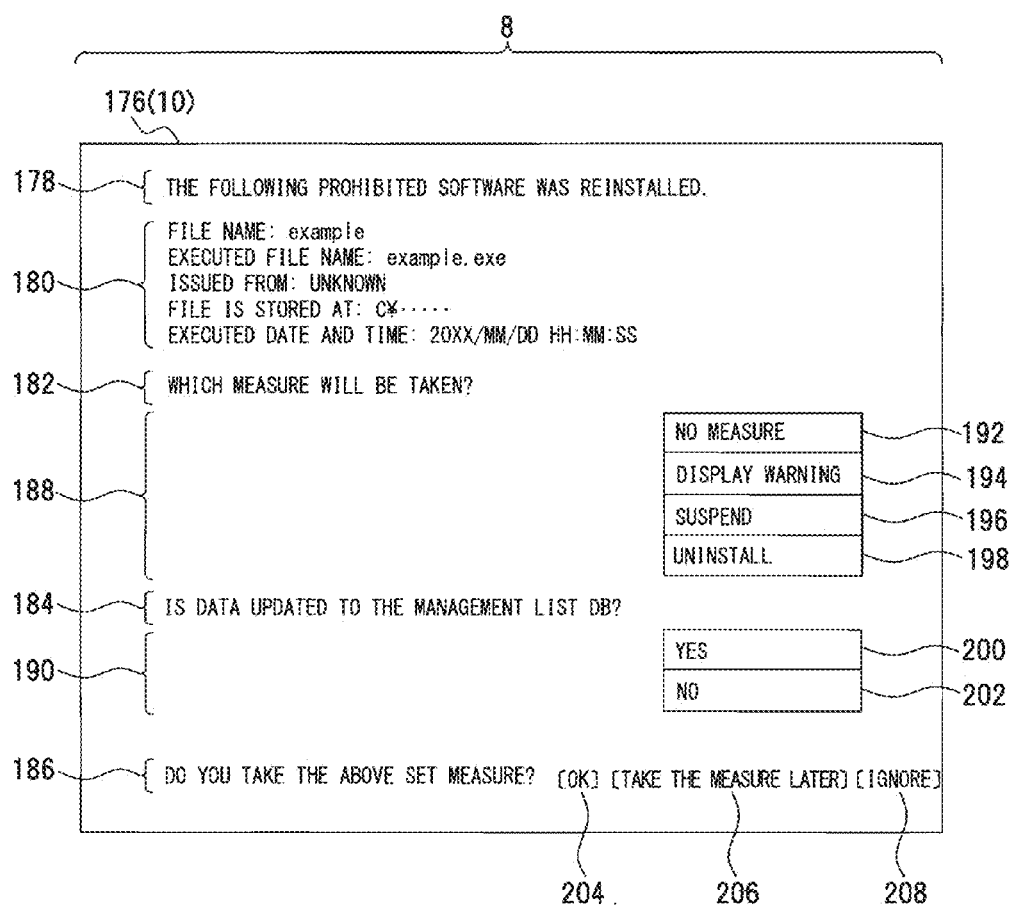
FIG. 12 depicts one example of a dialog box screen for the administrator.

The notification process P2 and the reaction process P3 are described with reference to FIG. 12. FIG. 12 depicts one example of a dialog box screen for an administrator.

This dialog box screen 176 is generated on the display screen 10 as the notification process P2 and the reaction process P3 when the administrator 4 boots the data processor 2, and notifies reinstallation of prohibited software by a user.

This dialog box screen 176 is generated on the display screen 10 when the user 6 executes reinstallation of prohibited software in the management list 58. In this dialog box screen 176, a notification message 178 representing execution thereof, execution contents 180, inquiries 182, 184 and 186 and dialog boxes 188 and 190 are displayed.

In the notification message 178 representing the execution, for example,
"The following prohibited software was reinstalled."
is displayed. Under the above, property information of software is expressed as the execution contents 180. For example,
"File name: example
Executed file name: example.exe
Issued from: unknown
File is stored at: C¥•••••
Executed date and time: 20XX/MM/DD HH:MM:SS"
is displayed. In the inquiry 182, as a measure concerning this software, for example,
"Which measure will be taken?"
is displayed. In the dialog box 188, boxes 192, 194, 196 and 198, each expressing "No measure", "Display warning", "Suspend" and "Uninstall" are set as concrete measures. If any one of these boxes 192-198 is checked, concerning software and data reinstalled at the user 6 side, a measure can be selected and determined in view of influence and maliciousness thereof, and a process therefore can be executed.

In the inquiry 184, as a measure concerning data of this software, for example,
"Is data updated to the management list DB?"
is displayed. In the dialog box 190, boxes 200 and 202, each expressing "YES" and "NO" are set as instruction manners thereof. If any one of these boxes 200 and 202 is checked, whether data thereof is updated is determined.

In the inquiry 186, about whether setting contents are determined, for example,
"Do you take the above set measure?"
is displayed. Selection units 204, 206 and 208 are displayed. In the selection unit 204, "OK" for approving setting contents, in the selection unit 206, "Take the measure later" concerning the measure, and in the selection unit 208, "Ignore" about an input are displayed. If one of them is selected and checked, one of processes is executed.

A management list display screen is described with reference to FIG. 13. FIG. 13 depicts one example of a management list display screen.

This management list display screen 210 is generated on the display screen 10 when the management list 58 in the management list DB 14 is displayed. Contents of this management list 58 are the same as the management list 58 depicted in FIG. 6.

Under this management list 58, an instruction button 212 used for ending the management list display screen 210 is displayed. Checking this instruction button 212 can end the management list display screen 210.

A data monitoring process is described with reference to FIG. 14. FIG. 14 is a flowchart depicting one example of processing procedure of data monitoring.

This processing procedure of data monitoring is one example of a data monitoring method of the data processor of the present invention or a data monitoring program thereof, and is processing procedure executing the above described reaction process P1.

When the user 6 boots the data processor 2 and executes an application (step S21), it is determined whether this application is software exiting in the management list 58 or not compared with data in the management list DB 14 (FIG. 6) (step S22). If this application is software existing in the management list 58 (YES of step S22), it is determined whether the application is prohibited software (step S23). If this application is not prohibited software (NO of step S23), the user 6 can execute the application (step S24). In this case, the user 6 can perform data processing without any obstacles.

If the application executed by the user 6 is not software registered in the management list 58 (NO of step S22), it is determined whether the application is added to the management list 58 (step S25). In accordance with a determination result thereof (YES or NO), a measure is taken (step S26).

If the application executed by the user 6 is registered in the management list 58 as prohibited software (YES of step S23), it is determined concerning the application whether a measure registered in the management list 58 is taken since the application is prohibited to be executed (step S27). If the measure is taken (YES of step S27), the measure in the management list 58 is taken (step S28). If the measure is not taken (NO of step S27), a process designated by the user 6 is taken (step S29).

By such data monitoring process, data processing at the user 6 side is recorded as an execution history, and a measure set at the administrator 4 side can be executed.

Figure 15:
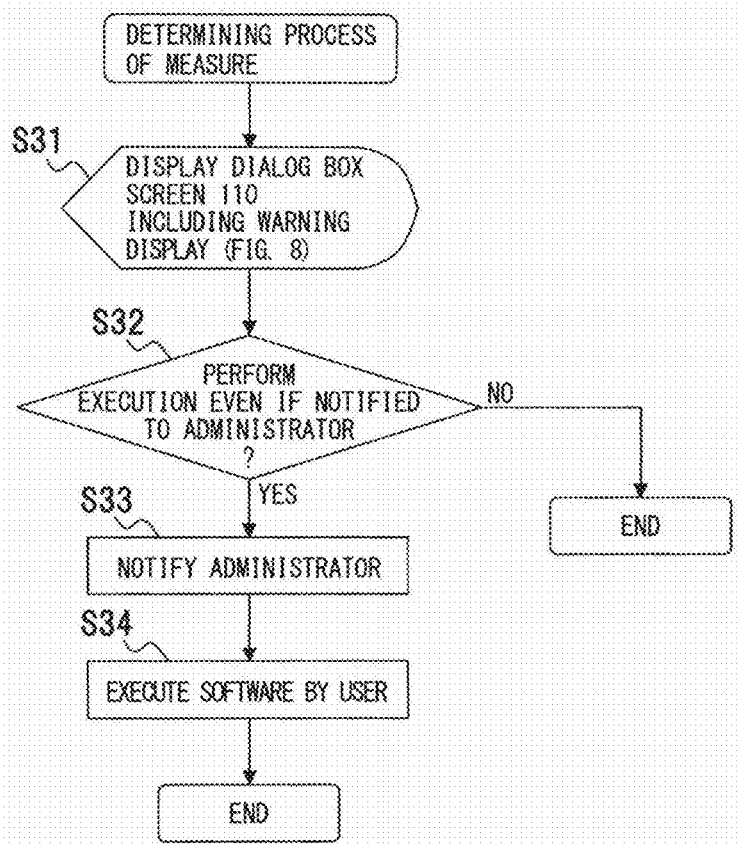
FIG. 15 is a flowchart depicting processing procedure if warning display is determined.

A determining process of a measure is described with reference to FIGS. 15, 16 and 17. FIG. 15 is a flowchart depicting processing procedure if warning display is determined, FIG. 16 is a flowchart depicting processing procedure if suspending is determined and FIG. 17 is a flowchart depicting processing procedure if forced deleting is determined.

Each processing procedure is one example of a data monitoring method of the data processor of the present invention or a data monitoring program thereof, and is processing procedure executing the above described reaction process P1.

If display warning is determined, as depicted in FIG. 15, the dialog box screen 110 accompanying with a warning display (FIG. 8) is displayed on the display 8 (step S31). In this dialog box screen 110, the user 6 is made to reply whether the user 6 executes a process thereof even if it is notified to the administrator (step S32). If the process is not executed (NO of step S32), this process is ended. If the process is executed (YES of step S32), notification information for notifying the administrator 4 is generated (step S33). Thus, execution of software by the user 6 is permitted (step S34).

Figure 16:
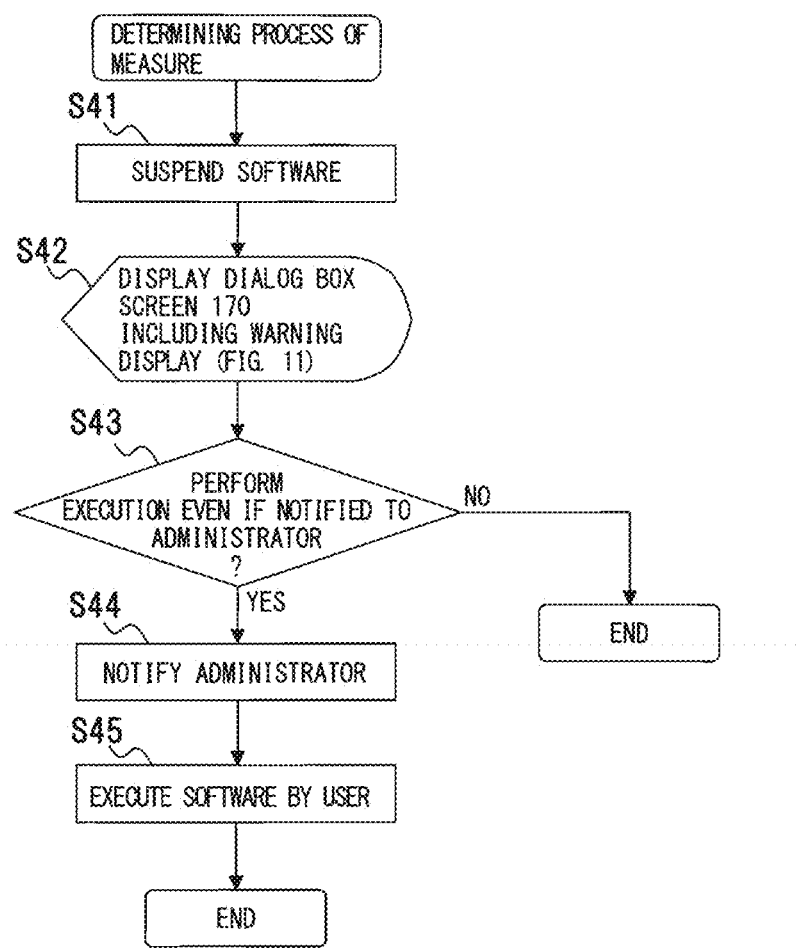
FIG. 16 is a flowchart depicting processing procedure if suspending is determined.
Figure 17:
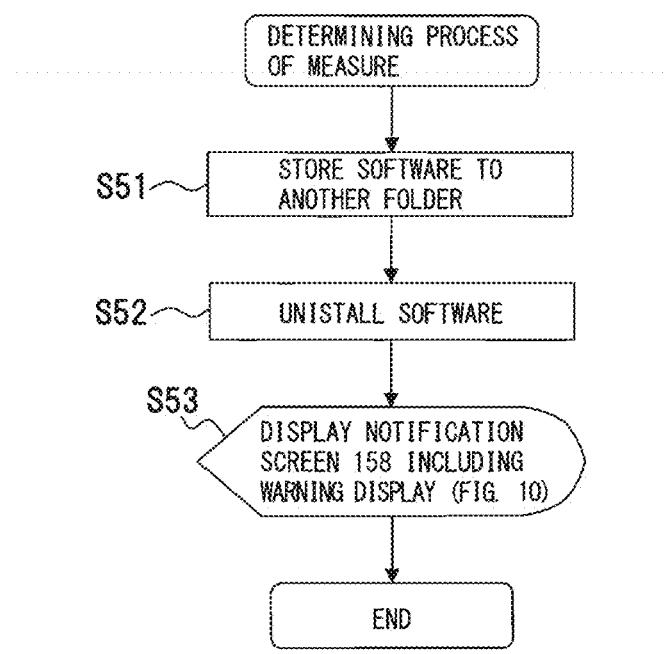
FIG. 17 is a flowchart depicting processing procedure if forced deleting is determined.

If suspending is determined, as depicted in FIG. 16, the dialog box screen 170 including suspending of software (step S41) along with a warning display thereabout (FIG. 11) is displayed on the display 8 (step S42). In this dialog box screen 170, the user 6 is made to reply whether the user 6 executes a process thereof even if it is notified to the administrator (step S43). If the process is not executed (NO of step S43), this process is ended. If the process is executed (YES of step S43), notification information for notifying the administrator 4 is generated (step S44). Thus, execution of software by the user 6 is permitted (step S45).

If forced deleting is determined, as depicted in FIG. 17, software is stored in another folder (step S51). Uninstallation of the software is executed (step S52). The notification screen 158 including a warning display (FIG. 10) is displayed on the display 8 (step S53), and this process is ended.

Figure 18:
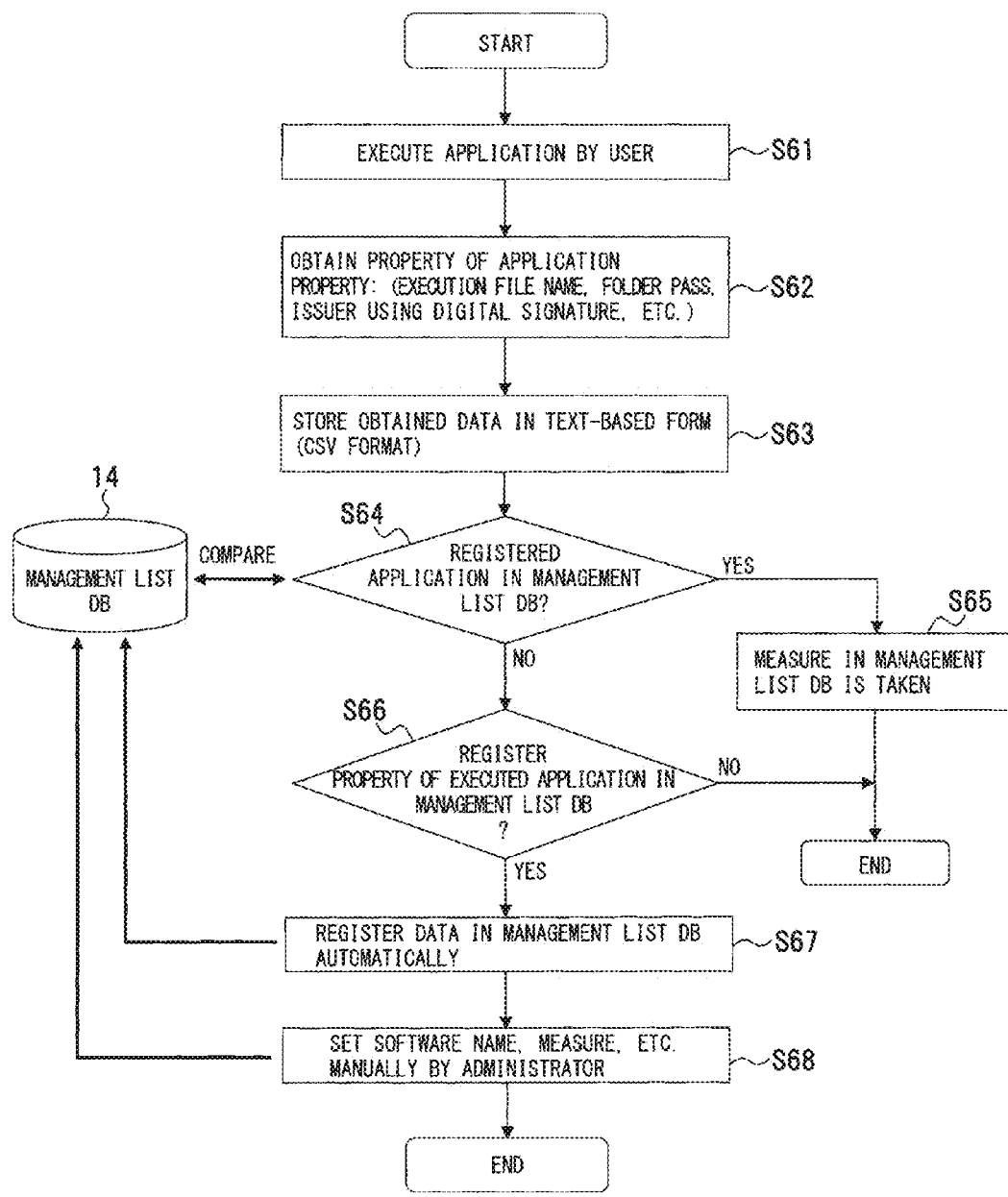
FIG. 18 is a flowchart depicting one example of processing procedure of a recording process.

A monitoring process of data is described with reference to FIG. 18. FIG. 18 is a flowchart depicting one example of processing procedure of a recording process of a software use of obtained data and application.

This processing procedure includes the reaction processes P1 and P3, and concerning software such as data and an application obtained by the user 6, includes a recording process of data processing such that the obtained data and software use are logged, and a reaction process at the administrator 4 side.

When the user 6 boots the data processor 2 and executes an application (step S61), property of the application is obtained (step S62). This property is an attribute of an application. For example, an execution file name, a folder pass, an issuer using a digital signature, etc. are obtained.

Obtained data is temporarily stored in a text-based form (step S63). In this case, stored data is, for example, recorded in a CSV (Comma Separated Value) format. A registration destination of this data is a management list table in the management list DB 14.

It is determined whether an obtained application is an application registered in the management list DB 14 compared with data in the management list DB 14 (step S64). If the obtained application is an application registered therein (YES of step S64), a measure in the management list DB 14 is taken (step S65), and this process is ended.

If the obtained application is not registered in the management list DB 14 (NO of step S64), it is determined whether property of the application is registered in the management list DB 14 (step S66). If property thereof is not registered (NO of step S66), this process is ended.

When property of an executed application is registered to the management list DB 14 (YES of step S66), data thereof is automatically registered in the management list DB 14 (step S67). In this case, in case of the administrator 4, the administrator 4 sets a software name, a measure, etc. manually in the management list 58 of the management list DB 14 (step S68), and this process is ended.

Figure 19:
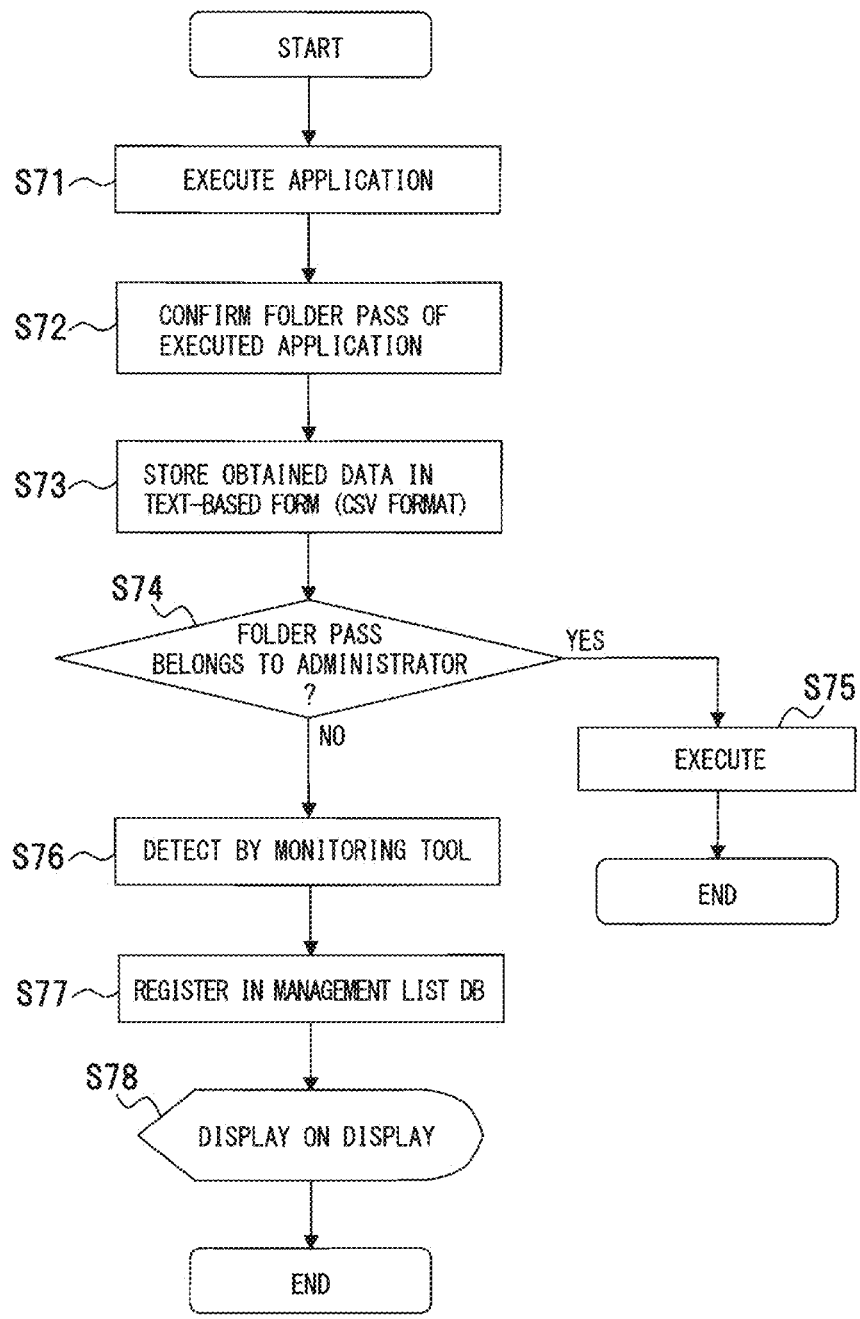
FIG. 19 is a flowchart depicting one example of processing procedure of a data monitoring process.

A monitoring process of data is described with reference to FIG. 19. FIG. 19 is a flowchart depicting one example of processing procedure of a data monitoring process.

This processing procedure includes the reaction process P1, and includes a process of distinguishing data and an application which the user 6 uses and if an application not exiting in the management list 58 is executed, registering this fact in the management list DB 14.

When the user 6 executes an application (step S71), a folder pass of the application is confirmed (step S72), obtained data is stored in a text-based form (step S73), and whether the folder pass belongs to an administrator 4 is determined (step S74). If the folder pass belongs to the administrator 4 (YES of step S74), the application is executed (step S75). After executing the application, this process is ended. Storing data may be executed in the above described CSV format.

If the folder pass does not belong to the administrator 4 (NO of step S74), it is detected by a monitoring tool, that is, the monitoring unit 30 that the application is not in the management list DB 14 (step S76), and the obtained data is registered in the management list DB 14 (step S77). When the administrator 4 boots the data processor 2, warning, etc. representing that the management list DB 14 is updated is displayed on the display 8 to notify the administrator 4 (step S78).

Figure 20:
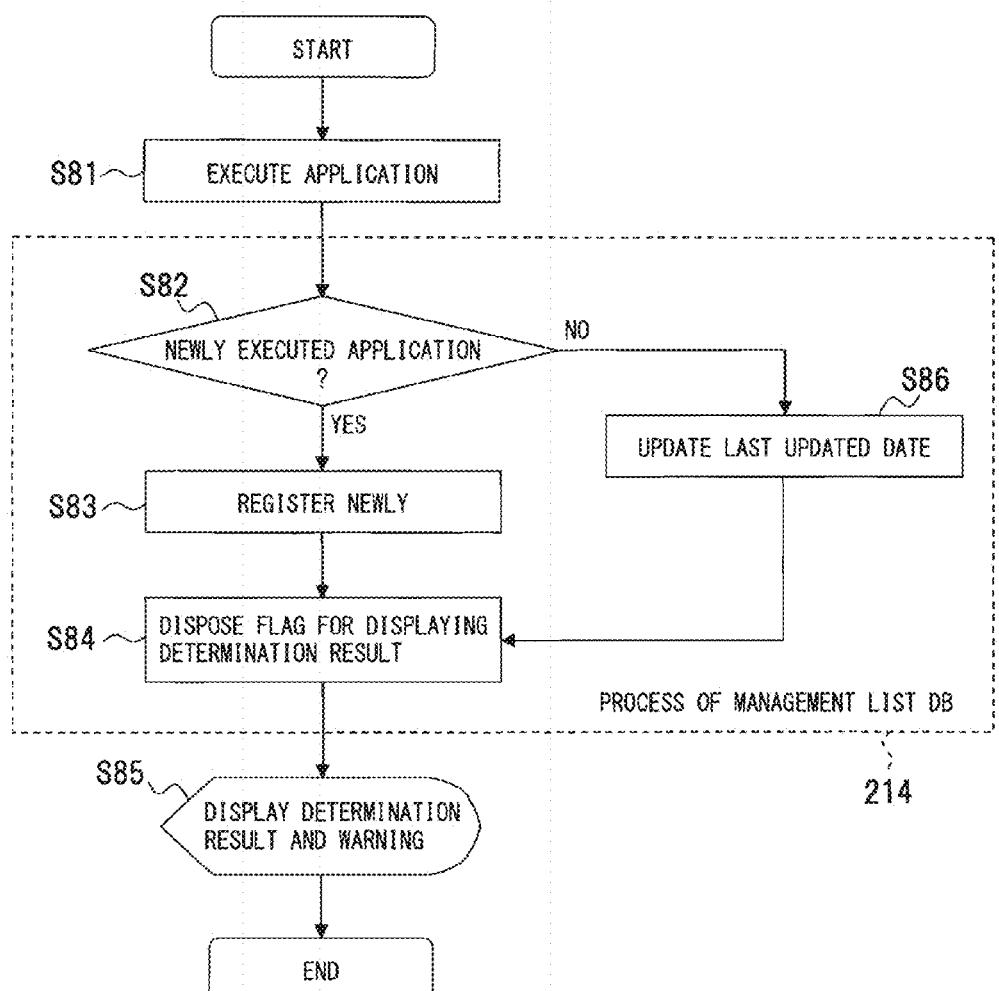

A data monitoring process is described with reference to FIG. 20. FIG. 20 is a flowchart depicting one example of processing procedure of determination of an application, a warning display and so on.

This processing procedure includes the reaction process P1 and the notification process P2, includes a process 214 of the management list DB 14, and includes a process of displaying a determination result, warning, etc.

When an application is executed (step S81), whether the application is newly executed is determined (step S82). If the application is a newly executed application (YES of step S82), data thereof is newly registered to the management list DB 14 (step S83), a flag for displaying a determination result is disposed (step S84) and a determination result and warning are displayed (step S85).

If not a newly executed application (NO of step S82), the executed application is an application registered in the management list DB 14. Thus, a last updated date and time thereof is updated (step S86). After disposing a flag for displaying a determination result thereof (step S84), the determination result thereof is displayed (step S85), and this process is ended.

Figure 21:
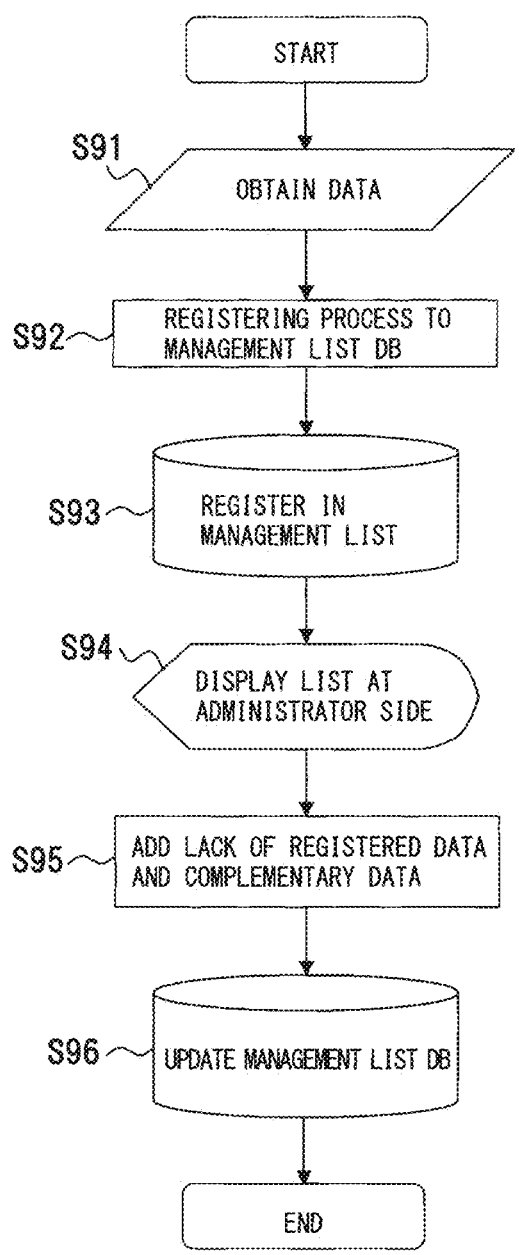
FIG. 21 is a flowchart depicting one example of processing procedure of the management list.

Processing procedure of the management list is described with reference to FIG. 21. FIG. 21 is a flowchart depicting one example of processing procedure of the management list.

This processing procedure includes the reaction processes P1 and P3, and includes a process of registering and/or updating data for the management list DB 14.

When data is obtained (step S91), as the reaction process P1, a registering process of the obtained data to the management list DB 14 is performed (step S92). Data thereof is registered in the management list DB 14 (step S93). Such registration result is displayed in the management list 58 as depicted in FIG. 13 if the administrator 4 boots the data processor 2 and selects display of the management list 58 (step S94). Lack of data registered in the management list 58 and complementary data are added (step S95), and the management list DB 14 is updated (step S96). If the instruction button 212 (FIG. 13) is clicked, display of the management list 58 can be ended.

Figure 22:
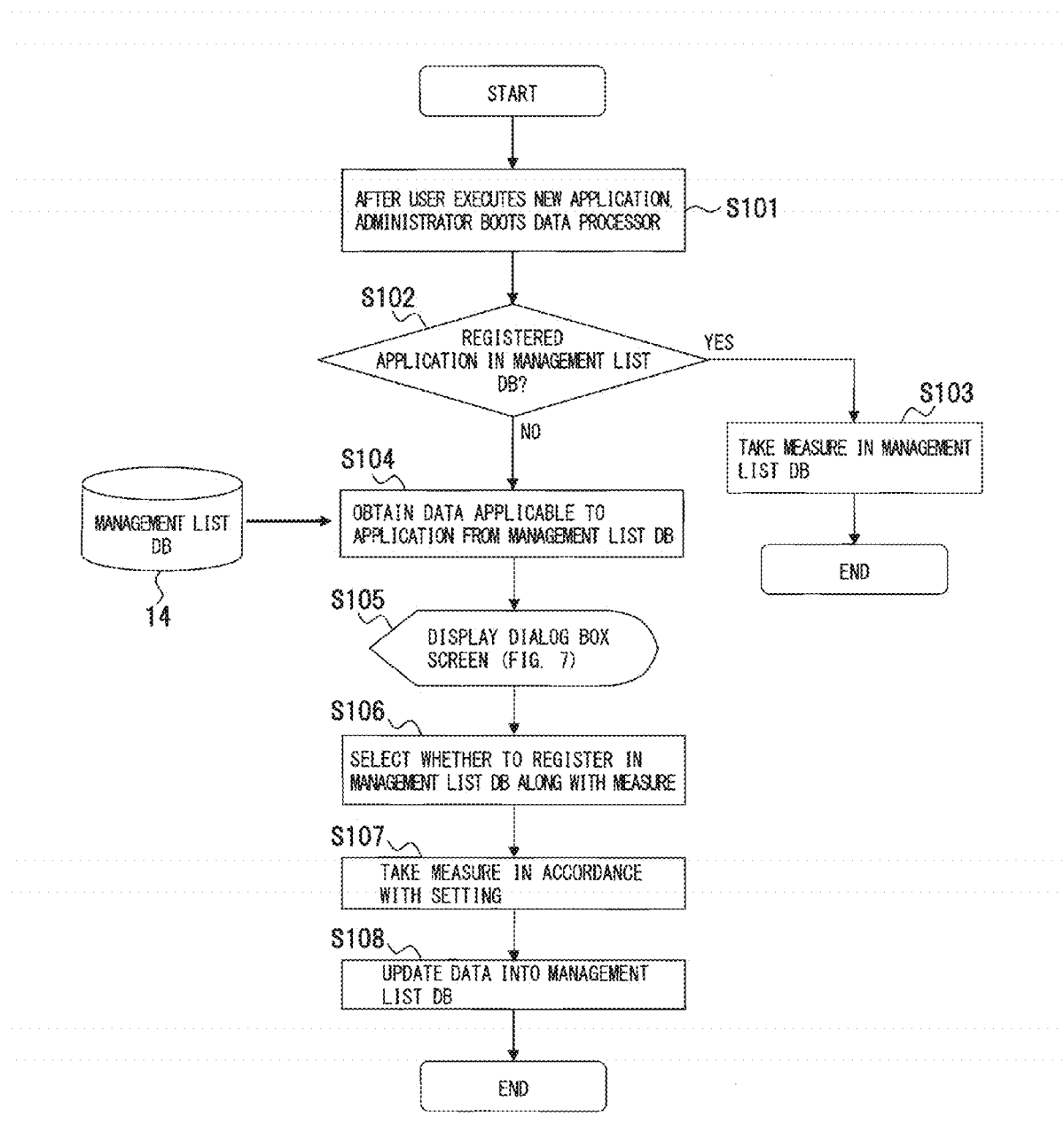
FIG. 22 is a flowchart depicting one example of processing procedure of the notification process P2 and the reaction process P3.

A data monitoring process at an administrator side is described with reference to FIG. 22. FIG. 22 is a flowchart depicting one example of processing procedure of the above described notification process P2 and reaction process P3.

This processing procedure is a process when the data processor 2 is booted at the administrator 4 side, and a process when software not existing in the management list 58 is executed by the user 6.

After the user 6 executes a new application, the administrator 4 boots the data processor 2 (step S101). Whether the application is an application registered in the management list 58 is determined (step S102). If the application is registered in the management list 58 (YES of step S102), a measure in the management list 58 is taken (step S103), and this process is ended.

If the application is not registered in the management list 58 (NO of step S102), data applicable to the application is obtained from the management list DB 14 (step S104). The dialog box screen 74 (FIG. 7) is displayed (step S105) and along with a measure, whether to register in the management list DB 14 is selected (step S106). A measure is taken in accordance with setting thereof (step S107). Data is updated into the management list DB 14 (step S108), and this process is ended.

Figure 23:
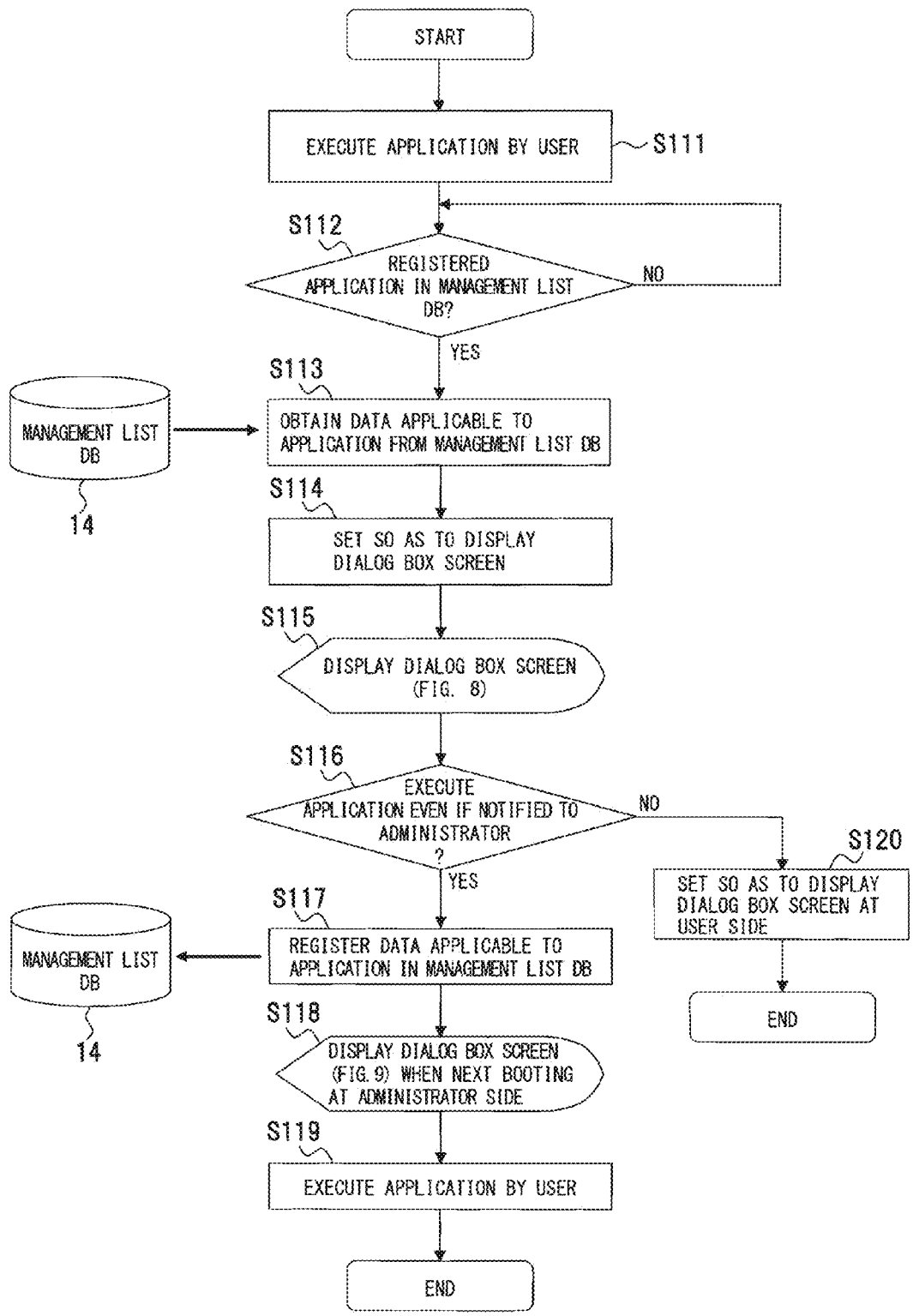
FIG. 23 is a flowchart depicting one example of processing procedure of a warning process.

A data monitoring process is described with reference to FIG. 23. FIG. 23 is a flowchart depicting one example of processing procedure of a warning process when a user executes prohibited software.

This processing procedure includes the reaction process P1 and the notification process P4. This processing procedure also includes a warning process when the user 6 executes software which is set prohibited in the management list 58.

When the user 6 executes an application (step S111), whether the application is registered in the management list 58 is determined (step S112). If the application executed by the user 6 is registered in the management list 58 (YES of step S112), data applicable to the application is obtained from the management list DB 14 (step S113). It is set that the dialog box screen 110 (FIG. 8) is displayed on the display 8 (step S114). The dialog box screen 110 (FIG. 8) is displayed (step S115). Whether the application is executed even if it is notified to the administrator 4 is determined (step S116). When the application is executed, (YES of step S116), data applicable to the application is registered in the management list DB 14 (step S117). The dialog box screen 124 (FIG. 9) is displayed when next booting at the administrator 4 side (step S118). The user 6 executes the application (step S119), and this process is ended.

Concerning the determination whether a process thereof is executed even if it is notified to the administrator 4, if the application is not executed (NO of step S116), it is set that a dialog box screen is displayed at the user 6 side (step S120), and this process is ended.

Figure 24:
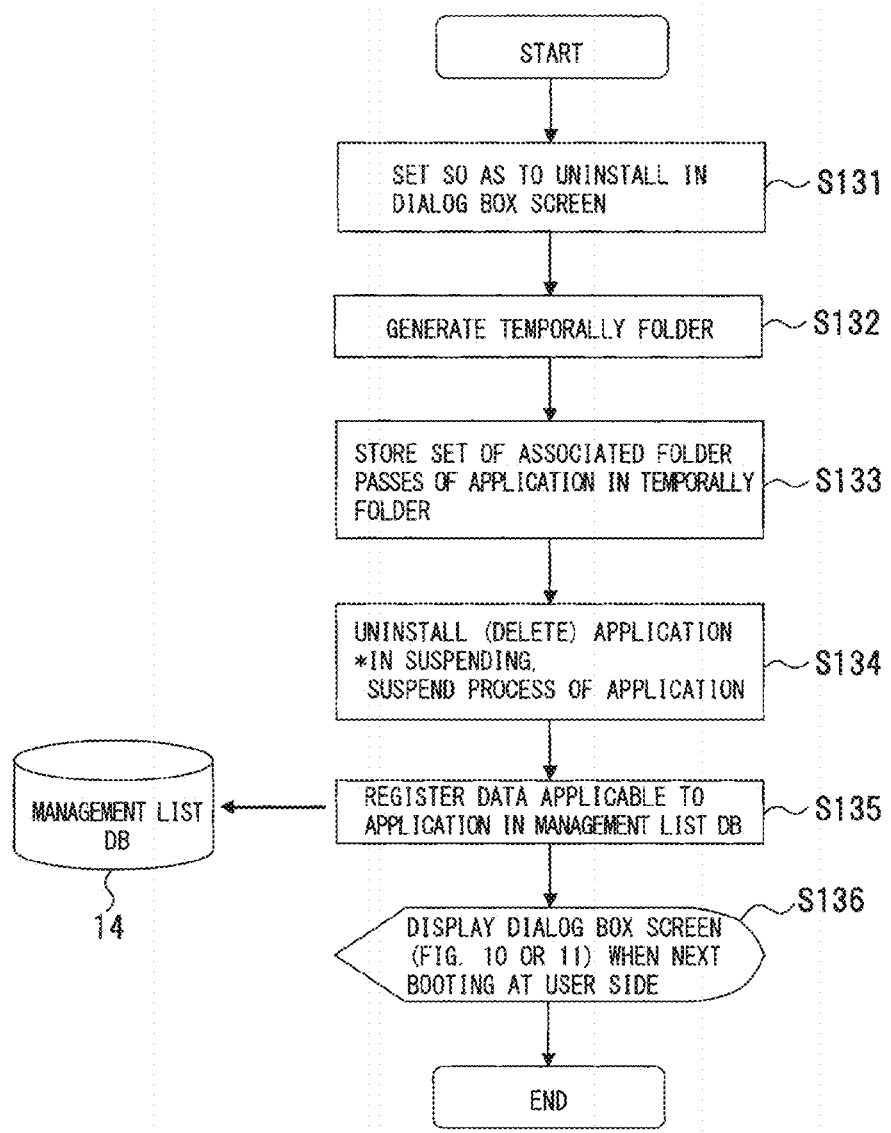
FIG. 24 is a flowchart depicting one example of processing procedure of a warning process.

A data monitoring process is described with reference to FIG. 24. FIG. 24 is a flowchart depicting one example of processing procedure of a warning process when an administrator deletes (or suspends) prohibited software.

This processing procedure includes the reaction process P3 and the notification process P4, and includes a warning process when software which is set prohibited in the management list 58 is deleted (or suspended).

In this process, when uninstallation is set in a dialog box screen (step S131), a temporally folder is generated (step S132). A set of associated folder passes of an application is stored in the temporally folder (step S133), and the application is deleted (uninstalled) (step S134). In suspending, a process of the application is suspended.

Data applicable to the application is registered in the management list DB 14 (step S135). When next booting at the user 6 side, the notification screen 158 (FIG. 10) or the dialog box screen 170 (FIG. 11) is displayed (step S136), and the reaction process P3 by the administrator 4 (FIGS. 1 and 2) is notified to the user 6.

Figure 25:
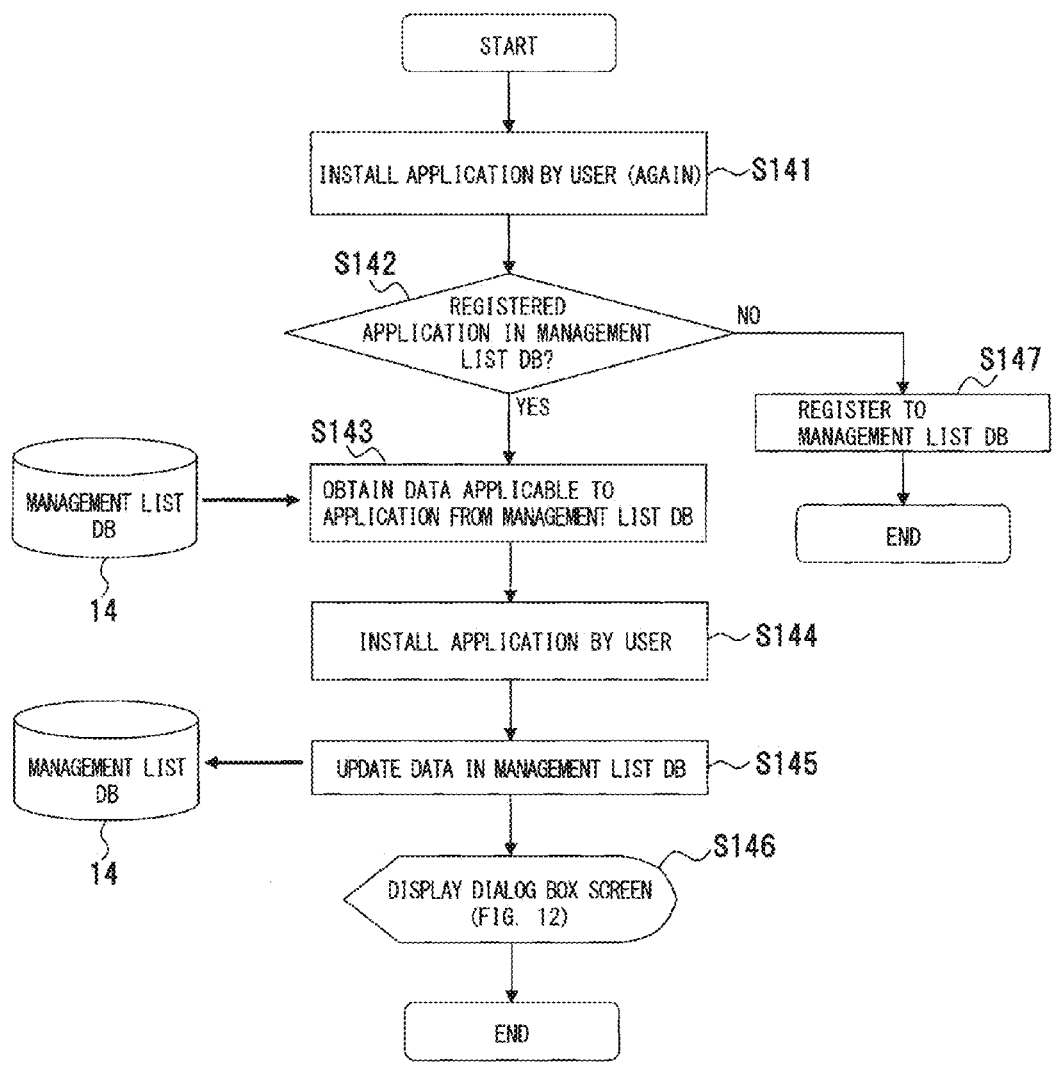
FIG. 25 is a flowchart depicting one example of processing procedure of a warning process.

A data monitoring process is described with reference to FIG. 25. FIG. 25 is a flowchart depicting one example of processing procedure of a warning process when a prohibited application is reinstalled.

This processing procedure includes the reaction process P1 and the notification process P2, and includes a warning process when an application which is prohibited to be executed in the management list 58 is reinstalled.

In this process, when the user 6 reinstalls an application which is set prohibited (step S141), whether the application is an application registered in the management list 58 is determined (step S142). If the application is registered in the management list 58 (YES of step S142), data applicable to the application is obtained from the management list DB 14 (step S143). If the user 6 installs the application (step S144), data is updated in the management list DB 14 (step S145), and the dialog box screen 176 (FIG. 12) is displayed (step S146). In accordance with the display of the dialog box screen 176, a measure is taken.

If the application is an application not registered in the management list 58 (NO of step S142), a process of registration to the management list DB 14 is performed (step S147), and this process is ended.

Second Embodiment

Figure 26:
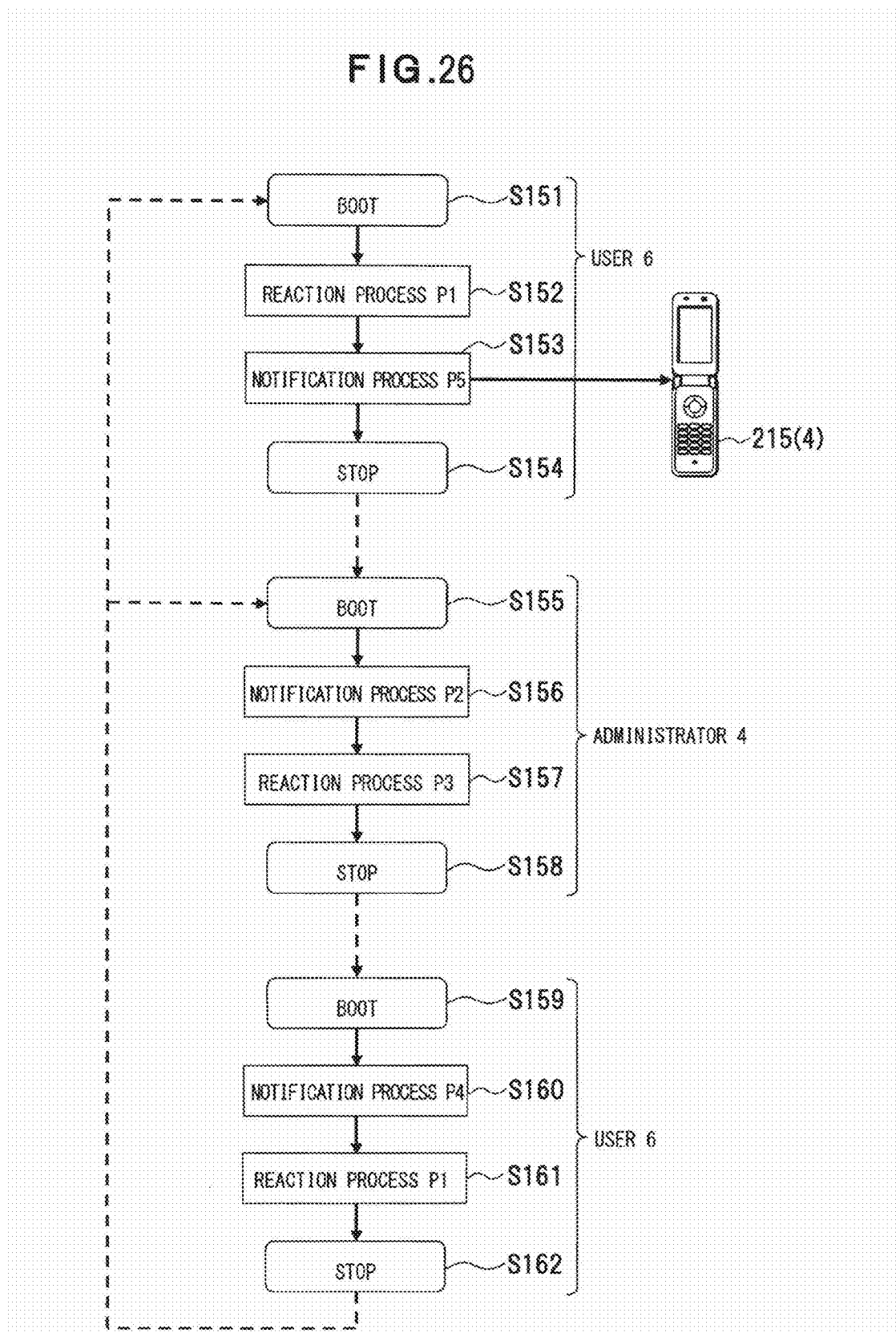
FIG. 26 depicts a schema of a data monitoring function of a data processor according to a second embodiment.

A second embodiment of the present invention is described with reference to FIG. 26. FIG. 26 depicts a schema of a data monitoring function of a data processor. In FIG. 26, the same components as FIG. 2 are denoted by the same reference numerals.

In the data monitoring process of the first embodiment, as described above, after the user 6 stops the data processor 2, the notification process P2 is executed when the administrator 4 boots the data processor 2. History information of data processing of the user 6 is notified to the administrator 4 on the data processor 2. On the contrary, in this embodiment, after the reaction process P1 for an input of the user 6, a notification process P5 is executed to a portable terminal device 25 of the administrator 4.

The data processor 2 is booted by the user 6 (step S151), and the reaction process P1 for an input process performing data processing such as installation of software and obtainment of data is executed (step S152), history information is generated, and is recorded. The notification process P5 that notifies the history information of the input process by the user 6, etc. to the administrator 4 side by mail, etc. is performed (step S153).

Based on stop of the data processor 2 by the user 6 (step S154) and booting of the data processor 2 by the administrator 4 (step S155), the notification process P2 is executed (step S156) and the reaction process P3 is executed by the administrator 4 (step S157).

When the administrator 4 stops the data processor 2 (step S158) and the user 6 boots the data processor 2 (step S159), the notification process P4 is executed (step S160) and the reaction process P1 for a data input by the user 6, etc. is executed (step S161).

The user 6 stops the data processor 2 (step S162). When the user 6 boots, a process is as step S151 and the following step S151. When the administrator 4 boots, the process is as step S155 and the following step S155.

In this embodiment, since history information of data processing of the user 6 is notified to the portable terminal device 215 via mail, etc., the notification process P5 can be executed rapidly. Since the notification process P2 is executed when the administrator 4 boots the data processor 2, data processing at the user 6 side and history information thereof can be surely notified to the administrator 4 to promote execution of the reaction process P3 to the administrator 4.

Other Embodiments (1) In the above embodiments, the management list 58 (FIG. 6) registered in the management list DB 14 may, as depicted in FIG. 27, be composed of a usable software name 216, an execution file name 218, an unusable software name 220, an execution file name 222 and a measure 224. In FIG. 27, the same components as FIG. 6 are denoted by the same reference numerals, and description thereof is omitted.

(2) In the above embodiment, the notification message 164 on the notification screen 158 (FIG. 10) may be changed to a notification message 264 representing that, as depicted in FIG. 28, uninstalled software is moved to a folder by the administrator 4. In this notification message 264, for example, "Administrator moved uninstalled software to the following folder."

may be displayed. As a notification process in case of using the software, a notification message 266 may be added. In this notification message 266, for example, "If using, you need reinstallation. It will be notified to the administrator."

may be displayed to notify processing contents thereof.

(3) In the above embodiments, a personal computer is exemplified as the data processor 2. The present invention may be applied to, as depicted in FIG. 29, a server 268 in which data processing is managed by the administrator 4 and in which data processing including installation of software is enabled by the user 6. As depicted in FIG. 30, the present invention also may be applied to a portable terminal device 270 in which data processing is managed by the administrator 4 and in which data processing including installation of software is enabled by the user 6. As depicted in FIG. 31, the present invention also may be applied to a Personal Digital Assistant (PDA) 272 in which data processing is managed by the administrator 4 and in which data processing including installation of software is enabled by the user 6. Similarly, the present invention may be applied to a device in which data processing is managed by the administrator 4 and in which data processing including installation of software is enabled by the user 6.

(4) In the above embodiments, the user 6 does not necessarily have to be a single, and may be a plurality of persons.

(5) In the present invention, relationship between the administrator 4 and the user 6 is constructed so that one is regarded as the user 6 based on a time point when an input of data can be executed uniquely by the one and at the time point, the other user who receives notification of history information of data processing of the user 6 is regarded as the administrator 4.

Technical ideas are then enumerated that are extracted from the embodiments of the present invention described above. The technical ideas according to the present invention, from superordinate concepts to subordinate concepts, can be grasped at various levels and in various variations and the present invention is not limited to the following description.

In the above data processor, preferably, the processing unit may output notification information representing the execution history based on booting by the administrator. According to such structure, when the administrator boots a data processor, the execution history of data processing at the user side can be confirmed by the notification information. The administrator can take measures according to the data processing of the user.

The above data processor may, preferably, include a communication unit to send out the execution history. According to such structure, the execution history concerning data processing of the user can be notified via the communication unit to a portable terminal device, etc. at an administrator side. The administrator can take measures according to the data processing of the user.

In the above data processor, preferably, the data processing may include at least one of installation of software and obtainment of data. Data processing to be monitored at the administrator side includes various processes such as installation of software and/or obtainment of data. Monitoring such data processing can avoid an unexpected case for data processing at the administrator side.

The above data processor may, preferably, include a data recording unit to record data representing processing contents of the data processing, wherein the processing unit compares data in the data recording unit with data representing executed data processing, and generates a monitored result representing whether the executed data processing is in the data recording unit or not. According to such structure, comparing the data representing processing contents of data processing in the data recording unit with the data representing executed data processing can monitor data processing thereof. A monitored result thereof can be generated as history information.

In the above data processor, preferably, the recording unit may include a registration table to register contents of the data processing, and registers a measure including any of usable, deleting, warning or suspending into the registration table every data processing. According to such structure, concerning installed software and data, the measure such as usable, deleting, warning or suspending can be selected every data processing in the registration table. The administrator can take a measure according to data processing of the user.

In the above data processor, preferably, the processing unit may generate notification information representing execution of a measure at the administrator side when booting by the user. According to such structure, when the user boots the data processor, the reaction process at the administrator side can be known immediately by the notification information. The user can take a measure according to a measure of the administrator.

In the above data processor, preferably, the processing unit may output notification information representing a measure of the administrator based on execution of the data processing by the user. According to such structure, the measure at the administrator side can be known every execution of data processing of the user. Influence on data processing at the administrator side can be prevented in advance.

In the above data processor, preferably, the processing unit may issue warning information for execution of prohibited data processing in the recording unit by the user. According to such structure, warning is issued every execution of data processing of a user. Thus, influence on data processing at the administrator side can be prevented in advance.

In the above data monitoring method of a data processor, preferably, the method may include outputting notification information representing the execution history based on booting by the administrator, the method may include sending out the execution history, the data processing may include at least one of installation of software and obtainment of data, the method may include recording data representing processing contents of the data processing to a data recording unit; and comparing data in the data recording unit with data representing executed data processing, and generating a monitored result representing whether the executed data processing is in the data recording unit or not, the method may include including a registration table to register contents of the data processing, and registering a measure including any of usable, deleting, warning or suspending into the registration table every data processing, the method may include generating notification information representing execution of a measure at the administrator side when booting by the user, the method may include outputting notification information representing a measure of the administrator based on execution of the data processing by the user, and the method may include issuing warning information for execution of prohibited data processing.

In the above recording medium storing the data monitoring program of the data processor, preferably, the method may include outputting notification information representing the execution history based on booting by the administrator, the method may include sending out the execution history, the data processing may include at least one of installation of software and obtainment of data, the method may include recording data representing processing contents of the data processing to a data recording unit; and comparing data in the data recording unit with data representing executed data processing, and generating a monitored result representing whether the executed data processing is in the data recording unit or not, the method may include including a registration table to register contents of the data processing, and registering a measure including any of usable, deleting, warning or suspending into the registration table every data processing, the method may include generating notification information representing execution of a measure at the administrator side when booting by the user, the method may include outputting notification information representing a measure of the administrator based on execution of the data processing by the user, and the method may include issuing warning information for execution of prohibited data processing.

(1) According to the present invention, relating to a data processor such as a personal computer in which data processing is managed by an administrator and in which data processing including installation of software by a user is enabled, an execution history of software installed and/or executed at the user side can be easily recognized at the administrator side, credibility of data processing at the administrator side can be enhanced.

(2) Leaking data in data processing at the administrator side can be prevented, and the data processing at the administrator side can be protected from influence and damage from the data processing at a user side.

(3) Since notification concerning data processing of a user and notification of a measure at an administrator side can be executed by the medium of a data processor, notification between the administrator and the user can be automated.

While the most preferred embodiments of the present invention have been described hereinabove, the present invention is not limited to the above embodiments, and it is a matter of course that various variations and modifications can be made by those skilled in the art based on the intent of the invention described in the scope of claims or described in the specification, and needless to say, such variations and modifications are also encompassed in the scope of the present invention.

The embodiments of the present invention relate to a data processor, a data monitoring method thereof, a data monitoring program thereof, and a recording medium storing the data monitoring program. The embodiments of the present invention can protect data and data processing at an administrator side in the data processor, where data processing is managed by the administrator and where data processing including installation of software is enabled by a user, from damage such as data leakage by file-sharing software, etc. Thus the present invention is useful.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A data processor in which data processing is managed by an administrator and in which data processing including installation of software by a user is enabled, the data processor comprising:
   a processing unit to monitor the data processing executed by the user and to generate an execution history of the data processing; and
   a recording unit to record the execution history of the data processing,
   wherein the processing unit confirms an operator of the data processor when the data processor is booted, and outputs notification information representing the execution history in association with booting of the data processor by the administrator as the operator.

2. The data processor of claim 1 further comprising a communication unit to send out the execution history.

3. The data processor of claim 1, wherein
   the data processing includes at least one of installation of software and obtainment of data.

4. The data processor of claim 1 further comprising a data recording unit to record data representing processing contents of the data processing, wherein
   the processing unit compares data in the data recording unit with data representing executed data processing, and generates a monitored result representing whether the executed data processing is in the data recording unit or not.

5. The data processor of claim 1, wherein
   the recording unit includes a registration table to register contents of the data processing, and registers a measure including any of usable, deleting, warning or suspending into the registration table every data processing.

6. The data processor of claim 1, wherein
   the processing unit generates notification information representing execution of a measure at the administrator side when booting by the user.

7. The data processor of claim 1, wherein
   the processing unit outputs notification information representing a measure of the administrator based on execution of the data processing by the user.

8. The data processor of claim 1, wherein
   the processing unit issues warning information for execution of prohibited data processing in the recording unit by the user.

9. A data monitoring method of a data processor in which data processing is managed by an administrator and in which data processing including installation of software by a user is enabled, the method comprising:
   monitoring the data processing executed by the user and generating an execution history of the data processing;
   recording the execution history of the data processing; and
   confirming an operator of the data processor when the data processor is booted, and outputting notification information representing the execution history in association with booting of the data processor by the administrator as the operator.

10. The data monitoring method of claim 9 further comprising sending out the execution history.

11. The data monitoring method of claim 9, wherein
    the data processing includes at least one of installation of software and obtainment of data.

12. The data monitoring method of claim 9, further comprising:
    recording data representing processing contents of the data processing to a data recording unit; and
    comparing data in the data recording unit with data representing executed data processing, and generating a monitored result representing whether the executed data processing is in the data recording unit or not.

13. The data monitoring method of claim 9, further comprising:
    including a registration table to register contents of the data processing, and registering a measure including any of usable, deleting, warning or suspending into the registration table every data processing.

14. The data monitoring method of claim 9 further comprising generating notification information representing execution of a measure at the administrator side when booting by the user.

15. The data monitoring method of claim 9 further comprising outputting notification information representing a measure of the administrator based on execution of the data processing by the user.

16. The data monitoring method of claim 9 further comprising issuing warning information for execution of prohibited data processing.

17. A non-transitory, computer-readable storage medium to store data monitoring program of a data processor, the data processor in which data processing is managed by an administrator and in which data processing including installation of software by a user is enabled, the program comprising:
    monitoring the data processing executed by the user and generating an execution history of the data processing;
    recording the execution history of the data processing; and
    confirming an operator of the data processor when the data processor is booted, and outputting notification information representing the execution history in association with booting of the data processor by the administrator as the operator.

* * * * *